US008549192B2

(12) United States Patent
Nakamura et al.

(10) Patent No.: US 8,549,192 B2
(45) Date of Patent: Oct. 1, 2013

(54) STREAM DATA CONTROL SERVER, STREAM DATA CONTROL METHOD, AND STREAM DATA CONTROLLING PROGRAM

(75) Inventors: Nobutatsu Nakamura, Tokyo (JP); Koji Kida, Tokyo (JP); Kenichiro Fujiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 973 days.

(21) Appl. No.: 12/203,622

(22) Filed: Sep. 3, 2008

(65) Prior Publication Data

US 2009/0063727 A1 Mar. 5, 2009

(30) Foreign Application Priority Data

Sep. 3, 2007 (JP) .................................. 2007-227622

(51) Int. Cl.
*G06F 3/00* (2006.01)
*G06F 5/00* (2006.01)

(52) U.S. Cl.
USPC .................................. 710/29; 710/36; 710/40

(58) Field of Classification Search
None
See application file for complete search history.

(56) References Cited

U.S. PATENT DOCUMENTS

| 6,457,051 | B1 * | 9/2002 | Riddle et al. | 709/224 |
|---|---|---|---|---|
| 7,376,334 | B2 * | 5/2008 | Sugimoto | 386/248 |
| 7,385,924 | B1 * | 6/2008 | Riddle | 370/235 |
| 7,734,875 | B1 * | 6/2010 | Hervas | 711/133 |
| 8,014,314 | B1 * | 9/2011 | Burke et al. | 370/253 |
| 2003/0035385 | A1 * | 2/2003 | Walsh et al. | 370/316 |
| 2003/0061263 | A1 * | 3/2003 | Riddle | 709/104 |
| 2003/0191853 | A1 * | 10/2003 | Ono | 709/232 |
| 2004/0082339 | A1 * | 4/2004 | Lee | 455/453 |
| 2007/0204028 | A1 * | 8/2007 | Lee | 709/223 |
| 2007/0230339 | A1 * | 10/2007 | Chen et al. | 370/230 |
| 2007/0253411 | A1 * | 11/2007 | Arad et al. | 370/389 |

FOREIGN PATENT DOCUMENTS

| JP | 20036005 A | 1/2003 |
|---|---|---|
| JP | 2004-70403 A | 3/2004 |
| JP | 2005-190590 A | 7/2005 |
| JP | 2005-196625 A | 7/2005 |
| JP | 2005-267313 A | 9/2005 |
| JP | 2006-260017 A | 9/2006 |

OTHER PUBLICATIONS

Communication dated Jan. 24, 2012, issued by the Japanese Patent Office in counterpart Japanese Application No. 2007-227622.
Shinichi Yamada, "An Optimization Method for Multiple Persistency Requirements on Stream Management System", Japanese Electronic Information Communication Institute Data Engineering Work Shop, 2007.

* cited by examiner

*Primary Examiner* — Kris Rhu
(74) *Attorney, Agent, or Firm* — Sughrue Mion, PLLC

(57) ABSTRACT

A stream data control server includes: a processable flow rate managing unit which manages a processable flow rate corresponding to an amount of data per unit time, which can be processed in each of storage units serving as storing destinations; a classified data flow rate managing unit which manages a data flow rate corresponding to an amount of data processed per unit time for each class of data to which a data priority is attached; and a storing destination control unit which controls the storing destinations of respective data based upon the processable flow rate of each of the storage units and the data flow rate for each class in such a manner that the data having higher data priorities are stored in the storage units having higher priorities within a range of the processable flow rate of each of the storage units.

18 Claims, 16 Drawing Sheets

FIG. 11

| CLASS | CONDITION | STORING DESTINATION |
|---|---|---|
| A | $(a \leqq x)$ | STORAGE UNIT 1 |
| | $(a \leqq y)$ | STORAGE UNIT 2 |
| B | $((a+b) \leqq x)$ | STORAGE UNIT 1 |
| | $((a+b) \leqq y)$ | STORAGE UNIT 2 |
| | $((a \leqq x) \& (b \leqq y))$ | STORAGE UNIT 2 |

STREAM DATA CONTROL SERVER, STREAM DATA CONTROL METHOD, AND STREAM DATA CONTROLLING PROGRAM

BACKGROUND OF THE INVENTION

1. Field of the Invention

The present invention relates to a stream data control server, a stream data control method, and a stream data controlling program, which cause a predetermined processing unit such as a storage unit and a filter unit to process data which is continuously generated.

2. Description of the Related Art

As technologies for storing data in storage units, for instance, JP 2003-006005 A has disclosed a method in which a data storage unit equipped with a plurality of storage media stores data in a storage medium having higher security according to a data priority of the data. FIG. 15 is a block diagram showing the data storage unit described in JP 2003-006005 A as a structural example. The data storage unit described in JP 2003-006005 A has been equipped with rule storage unit 91, data-priority calculating unit 92, storing destination selecting unit 95, security storage unit 96, and storing/migrating process unit 97.

In the above-mentioned configuration, the rule storage unit 91 stores therein a rule which gives orders to data based upon data priorities of the data, and the data-priority calculating unit 92 gives orders with respect to data stored in the storage unit based upon the rule stored in the rule storage unit 91. The security storage unit 96 stores therein a rule which gives orders to the plurality of storage media based upon security thereof, and also, the storing destination selecting unit 95 gives orders to the plurality of storage media employed in the storage unit based upon the rule stored in the security storage unit 96. The storing/migrating process unit 97 selects such a storage medium to which data should be stored from the plurality of storage media employed in the storage unit based upon the orders given to the data and the orders given to the storage media, and then, stores the data in the selected storage medium.

Also, in "An optimization method for multiple persistency requirements on stream management system" by Yamada et al. 2007, Japanese Electronic Information Communication Institute Data Engineering Workshop (DEWS), a method for realizing a plurality of storage processings with respect to data such as logs, which is generated in a continuous manner has been disclosed. FIG. 16 is a block diagram showing a stream management system as a structural example in "An optimization method for multiple persistency requirements on stream management system" by Yamada et al. 2007, Japanese Electronic Information Communication Institute Data Engineering Workshop (DEWS). The stream management system described in "An optimization method for multiple persistency requirements on stream management system" by Yamada et al. 2007, Japanese Electronic Information Communication Institute Data Engineering Workshop (DEWS) is equipped with a requirement description analyzing unit 81, an optimizing unit 82, a stream processor 83, a stream wrapper 84, a stream archiver 85, and also, a DBMS connector 86.

In the above-mentioned configuration, the requirement description analyzing unit 81 receives a data process request issued from a user, and then, transfers the received data process request to the optimizing unit 82. The optimizing unit 82 arranges the respective processings to the stream processor 83 and the stream archiver 85. The stream processor 83 accesses data which has been generated from a stream type information source stored via the stream wrapper 84, and also accesses data which has been stored via the stream archiver 85 so as to execute the processings arranged in the optimum manner. Then, the stream processor 83 returns the processed result to the user, or transfers the processed result to the stream archiver 85 in such a manner that the processed data is stored. The stream archiver 85 inputs and outputs stored data (archived data) via the DBMS connector 86 with respect to one or more pieces of DBMSs in accordance with the processings arranged in the optimum manner.

The above-mentioned conventional technologies have the following problem that, as a first problem, in such a case where a large amount of data which should be stored in the storage unit is generated in a continuous manner, data overflows may occur for any reasons other than the storage capacity of this storage unit. As a result, there are some possibilities that the data cannot be stored in the storage unit. For instance, if small-size data is continuously generated from a data source, or small-size data is generated from a large amount of data source, then a center side which processes those generated data is required to process the small-size data in the continuous manner. As a consequence, if an amount of data (hereinafter, referred to as "data flow rate") which should be processed per unit time exceeds another amount of data (hereinafter, referred to as "processable flow rate") per unit time, which can be actually processed according to storable or transferable speed of the data, then this storage unit must discard such data whose amount exceeds the processable flow rate. It should be noted that under the normal condition, a buffer is provided to the storage unit so as to absorb a difference between the data flow rate and the processable flow rate. However, when a data flow rate largely exceeds the processable flow rate, this storage unit cannot store the overflown data even in this buffer, and hence, the storage unit must discard such data which cannot be stored in the buffer, or other data which has already been stored in this buffer.

It should also be noted that in the data storage unit described in JP 2003-006005 A, the storage medium to which the data should be stored is selected by considering the capacity of the hard disk drive employed in this data storage unit, or considering the security thereof. However, the data storage unit does not consider the process performance of the selected storage medium. As a consequence, in such a case where this data storage unit is required to process the small-size and high priority data in the continuous manner, there are some possibilities that the data storage unit cannot store the data, because the process performance of the storage medium cannot accept this data storing operation.

Further, JP 2006-006005 A has described the method of controlling storing destinations of the data in view of the data priorities thereof. However, no concrete description has been made in that data having which data priority is stored in which storage medium. Also, since the above-mentioned operation for storing the data is not formularized, it is practically difficult to describe such a rule that the data priority of the data are defined with respect to the storage media to which the data should be stored in correspondence with each other.

On the other hand, the method described in "An optimization method for multiple persistency requirements on stream management system" by Yamada et al. 2007, Japanese Electronic Information Communication Institute Data Engineering Workshop (DEWS) has such a purpose that the processing itself is optimized, but never describes such a system for controlling a storing destination according to an amount of data. In other words, according to the method described in "An optimization method for multiple persistency requirements on stream management system" by Yamada et al. 2007, Japanese Electronic Information Communication Institute Data Engineering Workshop (DEWS), the algorithm is optimized by considering such an aspect of whether the contents of the processings can be commonly treated in the process flow. However, this method never considers how to control the storing destinations of the data when there are some possibilities that the data flow rate largely exceeds the processable flow rate.

SUMMARY OF THE INVENTION

The present invention has been made in view of the above, and therefore has an exemplary object to reduce possibilities of omissions as to data processings and to process the data more firmly even when a large amount of data is generated.

An exemplary aspect of the present invention provides a stream data control server for storing inputted data in any one of a plurality of storage units, including: processable flow rate managing means for managing a processable flow rate corresponding to an amount of data per unit time, which can be processed in each of the plurality of storage units; classified data flow rate managing means for managing a data flow rate corresponding to an amount of data processed per unit time for each class of data to which a data priority is attached; and storing destination control means for controlling storing destinations of respective data based upon the processable flow rate of each of the plurality of storage units and the data flow rate for each class in such a manner that the data having higher data priorities are stored in the storage units having higher priorities within a range of the processable flow rate of each of the plurality of storage units.

Another exemplary aspect of the present invention provides a stream data control server for storing inputted data in any one of a plurality of storage units, including: processable flow rate managing unit which manages a processable flow rate corresponding to an amount of data per unit time, which can be processed in each of the plurality of storage units; classified data flow rate managing unit which manages a data flow rate corresponding to an amount of data processed per unit time for each class of data to which a data priority is attached; and storing destination control unit which controls storing destinations of respective data based upon the processable flow rate of each of the plurality of storage units and the data flow rate for each class in such a manner that the data having higher data priorities are stored in the storage units having higher priorities within a range of the processable flow rate of each of the plurality of storage units.

Still another exemplary aspect of the present invention provides a stream data control server for processing inputted data by any one of a plurality of processing units, including: processable flow rate managing unit which manages a processable flow rate corresponding to an amount of data per unit time, which can be processed in each of the plurality of processing units; classified data flow rate managing unit which manages a data flow rate corresponding to an amount of data processed per unit time for each class of data to which a predetermined data priority is attached; and processing destination control unit which controls processing destinations of respective data based upon the processable flow rate of each of the plurality of processing units and the data flow rate for each class in such a manner that the data having higher data priorities are processed by the processing units having higher priorities within a range of the processable flow rate of each of the plurality of processing units.

Still another exemplary aspect of the present invention provides a stream data control method of storing inputted data in any one of a plurality of storage units, including: managing a processable flow rate corresponding to an amount of data per unit time, which can be processed in each of the plurality of storage units; managing a data flow rate corresponding to an amount of data processed per unit time for each class of data to which a data priority is attached; and controlling storing destinations of respective data based upon the processable flow rate of each of the plurality of storage units and the data flow rate for each class in such a manner that the data having higher data priorities are stored in the storage units having higher priorities within a range of the processable flow rate of each of the plurality of storage units.

Still another exemplary aspect of the present invention provides a stream data controlling program for storing inputted data in any one of a plurality of storage units, causing a computer to execute the processings of: calculating a processable flow rate corresponding to an amount of data per unit time, which can be processed in each of the plurality of storage units; calculating a data flow rate corresponding to an amount of data processed per unit time for each class of data to which a data priority is attached; and controlling storing destinations of respective data based upon the processable flow rate of each of the plurality of storage units and the data flow rate for each class in such a manner that the data having higher data priorities are stored in the storage units having higher priorities within a range of the processable flow rate of each of the plurality of storage units.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 11 is an explanatory diagram for describing an example of a storing destination determining rule held in a storing destination determining rule storage unit;

DETAILED DESCRIPTION OF THE PREFERRED EMBODIMENTS

A stream data control server, a stream data control method and a stream data controlling program of the present invention will be described in detail below with reference to the accompanying drawings. It should be noted in the present invention that each of data pieces which are generated in a continuous manner is called "stream type data", and those stream type data pieces are referred to herein collectively as "stream data."

First Exemplary Embodiment

Figure 1:
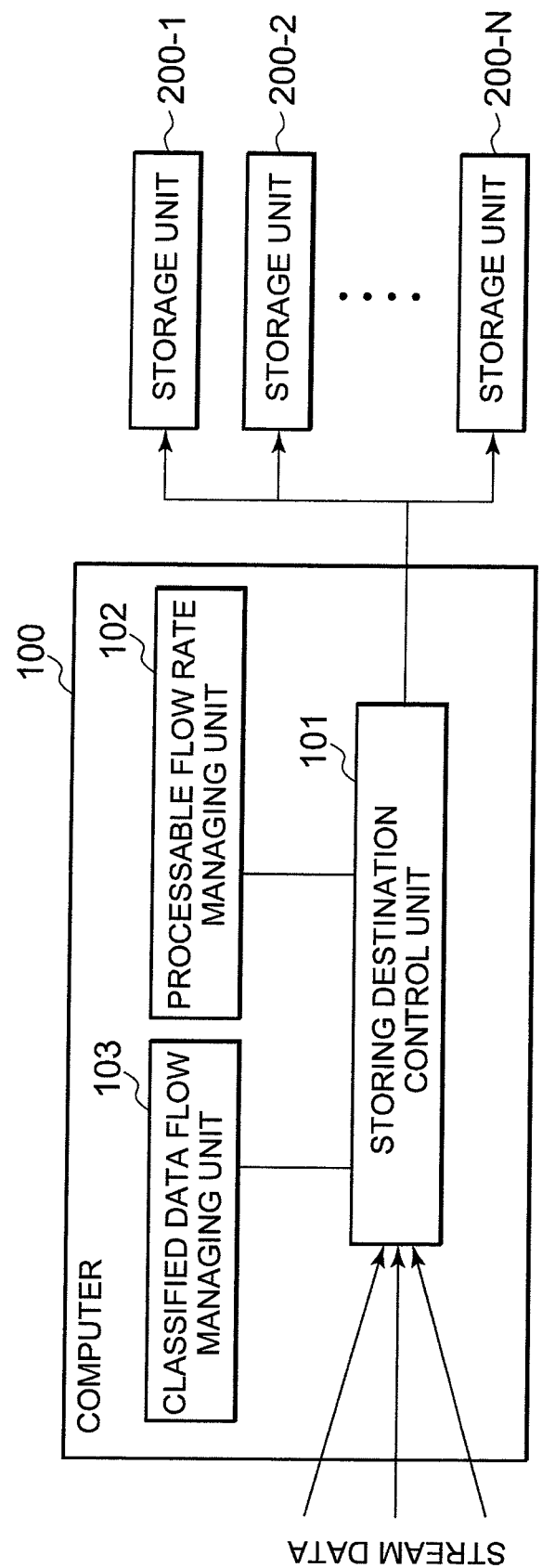
FIG. 1 is a block diagram showing a structural example of a stream data control server according to a first exemplary embodiment of the present invention.

FIG. 1 is a block diagram showing a structural example of a stream data control server according to a first exemplary embodiment of the present invention. The stream data control server shown in FIG. 1 is equipped with a computer 100, and a plurality of storage units 200 (namely, 200-1 to 200-N (symbol "N" being integer larger than 2)), which store therein data.

Also, the computer 100 contains storing destination control unit 101, processable flow rate managing unit 102, and classified data flow rate managing unit 103.

The storing destination control unit 101 controls storing destinations of each data in the manner described below based upon processable flow rates of the respective storage units 200 and data flow rates for each class of data. That is, the storing destinations of each data are controlled in a range of the processable flow rate of the respective storage units 200 in such a manner that if a data priority of data is higher than that of other data, then this data is stored in a storage unit having a higher priority than that of other storage units. It should be note that the processable flow rates of the respective storage units 200 are managed by the processable flow rate managing unit 102, and that the data flow rates for each class of data are managed by the storing destination control unit 101.

In this case, a processable flow rate indicates an amount of data per unit time, which can be processed by a storage unit. A data flow rate indicates an amount of data processed per unit time in the stream data control server. In other words, the data flow rate indicates such an amount of data which is generated per unit time with respect to the stream data control server.

The processable flow rate managing unit 102 manages processable flow rates of the respective storage units 200. Concretely speaking, the processable flow rate managing unit 102 manages the processable flow rates of the respective storage units 200 by calculating the processable flow rates of the respective storage units 200 at predetermined timing based upon process performance of the respective storage units 200 and amounts of processed data thereof at this timing. It should also be noted that the processable flow rate managing unit 102 acquires information (namely, information indicative of process performance, and information indicative of amount of processed data) which is required in order to calculate the processable flow rates, for instance, by referring to information which has been previously stored, by deriving the information from a result of controlling storing destinations of data by the stream data control server, or by acquiring the information from the respective storage units 200 by using a standard network management protocol such as a simple network management protocol (SNMP), or a web-based enterprise management (WBEM).

It should also be noted that, in the present invention, the processable flow rate managing unit 102 calculates a processable flow rate with respect to each unit which processes (stores) stream data. In other words, if one storage unit has a number of components connected in parallel, then the processable flow rate managing unit 102 calculates a processable flow rate based upon process performance of distributed parallel processings. Further, if one storage unit has a number of components connected in series, then the processable flow rate managing unit 102 calculates a processable flow rate based upon process performance (namely, process performance rate-controlled to latest portion) of series processings. Normally, since a network interface portion corresponds to the latest portion, the above-mentioned process performance is rate-controlled to process performance of this network interface portion.

The classified data flow rate managing unit 103 manages data flow rates for each class of data to which one data priority is attached. Concretely speaking, the classified data flow rate managing unit 103 manages data flow rates for each class of the data by calculating a data flow rate at predetermined timing with respect to each class of data based upon both classes of data which have been acquired (received) by the stream data control server so far, and a data acquisition time (data reception time). It should also be noted that the expression "class" described in the specification indicates a group of data which the same data priority is attached to. The "class" may be made of any class such as a type of data, a character string contained in data, a data list, or a range of numeral values, and the like.

In the first exemplary embodiment, the storing destination control unit 101 determines a storage unit as a storing destination for each data priority of data based upon both processable flow rates of the respective storage units 200 and data flow rates for each class at predetermined timing, and after the storing destination control unit 101 judges a data priority of data with respect to each of received data, the storing destination control unit 101 controls storing destinations of the respective data in accordance with the storing destinations for each data priority which has been determined at this timing.

Figure 2:
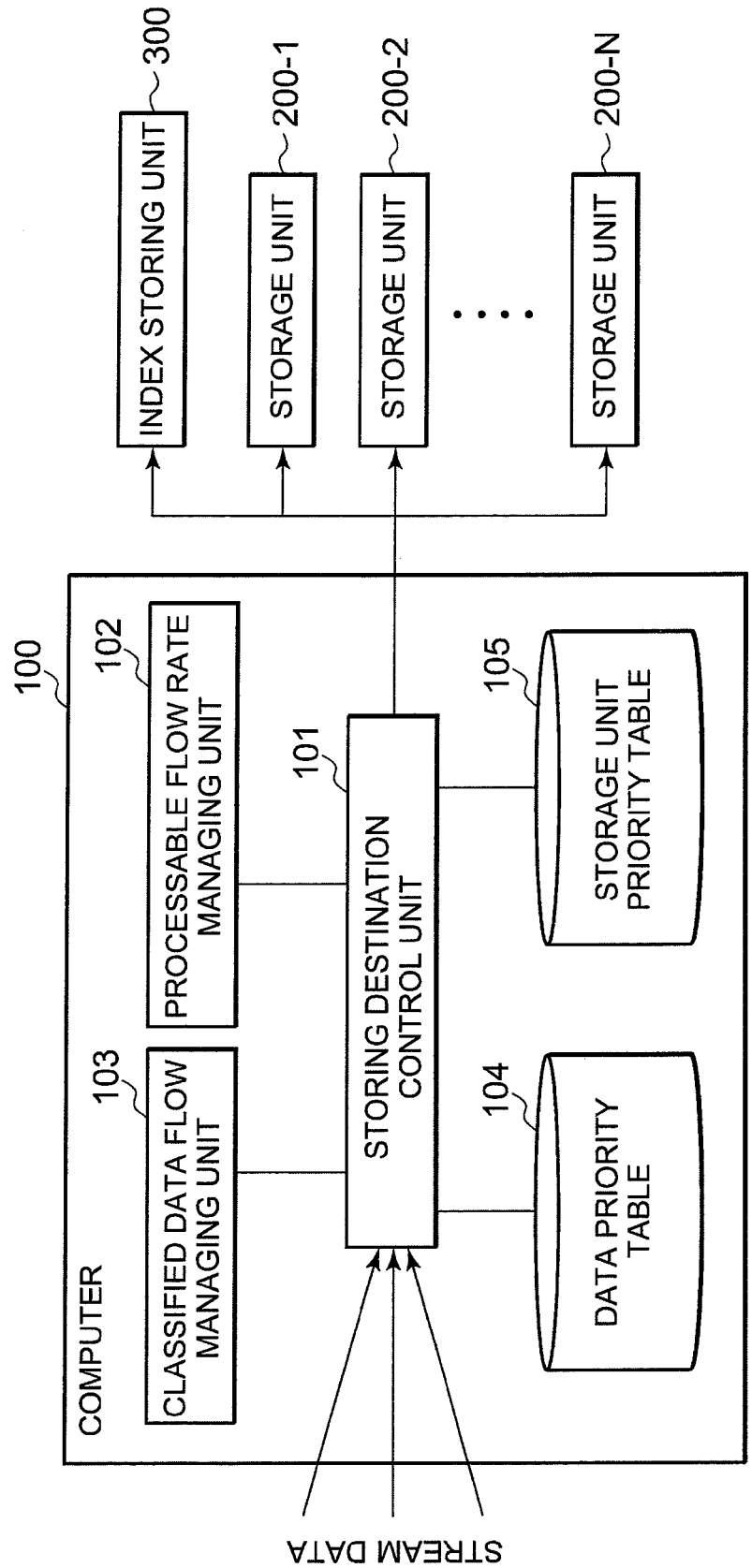
FIG. 2 is a block diagram showing a more concrete structural example of the stream data control server according to the first exemplary embodiment.

Hereinafter, a description is made of the stream data control server with reference to a more concrete structural example. FIG. 2 is a block diagram showing a more concrete structural example of the stream data control server according to the first exemplary embodiment. The stream data control server shown in FIG. 2 is equipped with the computer 100, the plurality of storage units 200 (200-1 to 200-N), and an index storing unit 300.

The computer 100 corresponds to such a computer which is equipped with a central processing unit, a processor, a data processing unit, and the like, which are operated under control of a program. The computer 100 contains the storing destination control unit 101, the processable flow rate managing unit 102, the classified data flow rate managing unit 103, a data priority table 104, and a storage unit priority table 105.

The index storing unit 300 manages information which indicates a data and the storage unit 200 which has stored the data. Concretely speaking, while information (index) that is an identifier of each data is attached to the each data, the index storing unit 300 stores therein information indicative of a storing destination (namely, any one of storage units 200) of the relevant data in correspondence with an attached index.

The data priority table 104 holds therein information required for attaching data priorities to respective data pieces which are generated in a continuous manner. Concretely speaking, the data priority table 104 corresponds to storage unit for storing therein information which defines an identification number for a class of data to which one data priority is attached, information for determining the class, and a data priority which is attached to data belonging to the class in correspondence with each other.

The storage unit priority table 105 holds therein information indicative of priorities of the respective storage units 200. Concretely speaking, the storage unit priority table 105 corresponds to storage unit for storing therein information which defines identification numbers of the respective storage units 200 and priorities which are allocated to the relevant storage units 200 in correspondence with each other.

It should also be noted that the storing destination control unit 101, the processable flow rate managing unit 102, and the classified data flow rate managing unit 103 have already been described in the foregoing description.

In the first exemplary embodiment, the storing destination control unit 101, the processable flow rate managing unit 102, and the classified data flow rate managing unit 103 are realized by, concretely speaking, a central processing unit, a processor, a data processing unit, and the like, which are operated under control of a program employed in the computer 100. Also, the data priority table 104 and the storage unit priority table 105 are realized by a storage unit provided in the computer 100.

Also, the index storing unit 300 is realized by, concretely speaking, a storage apparatus. It should also be noted that the above-mentioned index storing unit 300 may alternatively be contained in the computer 100, or an arbitrary storage unit 200 (namely, any one of storage units 200-1 to 200-N).

Figure 3:
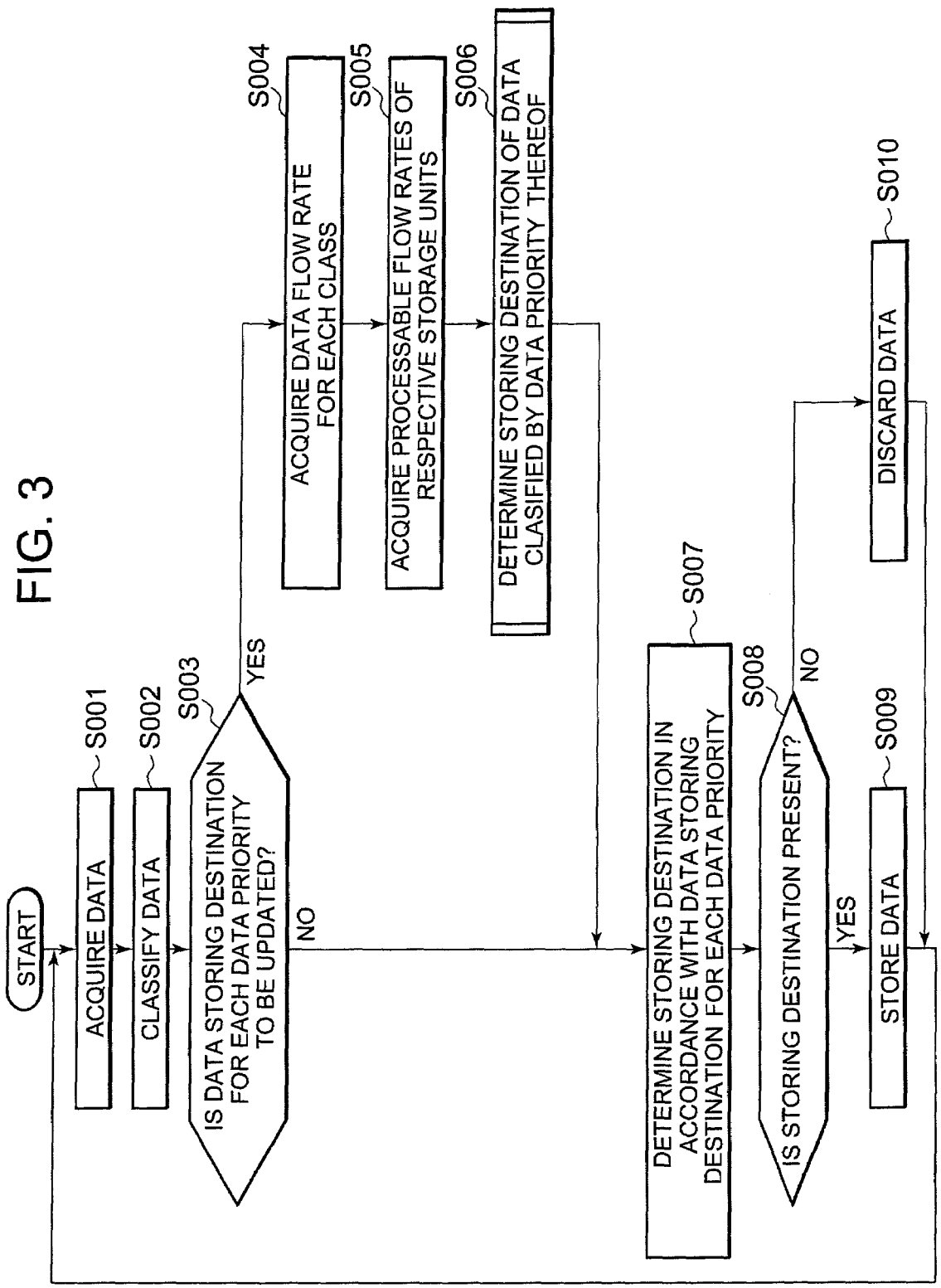
FIG. 3 is a flowchart for describing an operation example of the stream data control server according to the first exemplary embodiment.

Next, an operation of the first exemplary embodiment is described. FIG. 3 is a flowchart showing an example about operations of the stream data control server according to the first exemplary embodiment. As shown in FIG. 3, firstly, when the storing destination control unit 101 acquires (receives) each data of stream data which is generated from a stream type data generating source (Step S001), the storing destination control unit 101 refers to the data priority table 104 so as to attach a data priority to the acquired data (Step S002). In other words, the storing destination control unit 101 determines a class of data to which one data priority is attached with respect to the acquired data to classify this data according to the attached data priority thereof. For instance, the data priority table 104 includes combinations character strings or data lists used in pattern matching for data classification and a data priority which is attached to a data matches the pattern of the character strings or the data lists. When the acquired data matches a pattern of character strings or data lists, the storing destination control unit 101 gives a data priority associated with the pattern to the data.

Next, the storing destination control unit 101 judges whether or not to update information indicative of a data storing destination for each data priority (Step S003). The updating operation may be alternatively triggered, for instance, every time a predetermined period of time has elapsed, every time a predetermined quantity of data is processed, or when a request is issued from a server operation manager. In this step, when the storing destination control unit 101 updates the information indicative of the data storing destination for each data priority, the storing destination control unit 101 executes processings defined from a Step S004 to Step S006, and hence, the information indicative of the data storing destination for each data priority is updated.

In Step S004, the storing destination control unit 101 acquires a data flow rate for each class of data. In order to acquire the data flow rate for each class of the data, for example, the storing destination control unit 101 may instruct the classified data flow rate managing unit 103 to calculate a data flow rate for each class of the data at present, and may receive the calculation result. Alternatively, for instance, the classified data flow rate managing unit 103 may calculate a data flow rate for each class of the data according to an updating trigger having independent timing with respect to that of the storing destination control unit 101, and then, the storing destination control unit 101 may refer to a value about the data flow rate for each class of the data which has been held by the classified data flow rate managing unit 103 at present. It should also be noted that, in order to calculate a data flow rate for each class of data, for instance, the classified data flow rate managing unit 103 may hold data acquisition quantities for each class of the data per a unit time when the data flow rate is calculated. Otherwise, the classified data flow rate managing unit 103 may hold both data acquisition time instants and a data priority with respect to a predetermined quantity of received data by which the updating operation is triggered. In such a case where the storing destination control unit 101 updates a data flow rate for each class of data at the timing of data acquisition, the storing destination control unit 101 may alternatively execute the processing of the classified data flow rate managing unit 103.

In Step S005, the storing destination control unit 101 acquires a processable flow rate of each of the storage units 200. The processable flow rates of the respective storage units 200 are acquired in a similar manner to the previously described data flow rate for each class acquisition. For instance, the storing destination control unit 101 may instruct the processable flow rate managing unit 102 to calculate processable flow rates of the respective storage units 200 at present, and then, may receive the calculation result from the processable flow rate managing unit 102. Also, for example, the processable flow rate managing unit 102 may alternatively calculate the processable flow rates of the respective storage units 200 by receiving an updating trigger having timing independent from that of the storing destination control unit 101, and then, the storing destination control unit 101 may refer to values as to the processable flow rates of the respective storage units 200, which are held by the processable flow rate managing unit 102 at present. It should also be noted that the processable flow rate managing unit 102 may alternatively calculate the existing processable flow rate based upon an amount of data (referred to as "Xcurrent") processed per unit time, which has been acquired by employing unit such as the WBEM and the SNMP, and a maximum value (referred to as "Xmax") of amounts of data which can be processed per unit time, and which is a catalog-listed value given as a set value, or a value measured in a load test or a benchmark test.

In Step S006, the storing destination control unit 101 determines a storing destination of data classified by a data priority based upon the data flow rate for each class of the acquired data and the processable flow rates of the respective storage units 200. Processings for determining the data storing destinations for each data priority is described in detail later, which are performed by the storing destination control unit 101.

Next, the storing destination control unit 101 determines a storing destination of data in accordance with data storing destinations for each data priority, which have been determined at present, or have newly been determined based upon data priorities of data (Step S007). In this step, if the storing destination is determined, then the storing destination control unit 101 stores the relevant data to the storage unit 200 indicated as this determined storing destination ("Yes" in Step S008, and Step S009). On the other hand, if the storing destination is not determined, then the storing destination control unit 101 discards the relevant data ("No" in Step S008, and Step S010). To the respective data pieces, sequential IDs (indexes) are attached. Then, when the storing destination control unit 101 stores the respective data pieces to the storage units 200, the storing destination control unit 101 stores such information in the index storing unit 300, while the above-mentioned information indicates that data having which index has been stored in which data storage unit 200. Then, the process operation by the stream data control server returns to Step S001 in order to process data (stream data) which will be subsequently generated.

Figure 4:
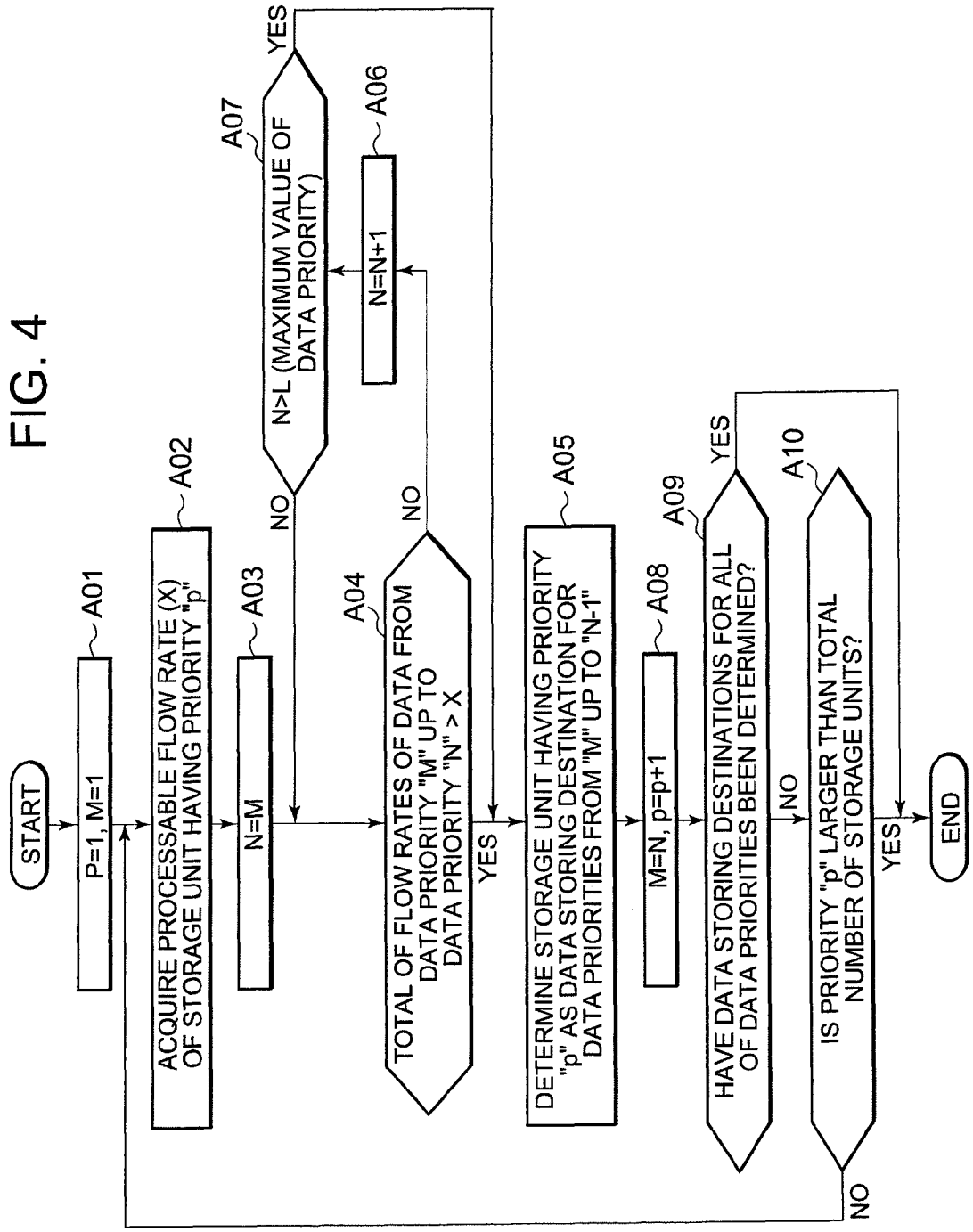
FIG. 4 is a diagram showing a process flow illustrating one example of a processing for determining data storing destinations executed by storing destination control unit based upon data priorities.

FIG. 4 is a flowchart showing an example about the processing for determining the data storing destination for each data priority, which is executed by the storing destination control unit 101 (namely, Step S006 shown in FIG. 3). The process flow indicated in FIG. 4 implies such a process flow that data pieces having higher data priorities are sequentially allocated to storage units having the highest priorities among storage units 200 capable of storing therein flow rates of the above-mentioned data.

In the processings described below, a priority parameter "p" is employed as a calculation parameter indicative of any one of possible values of the priorities of the storage units 200. Also, data priority parameters "M" and "N" are employed as calculation parameters indicative of any of possible values of the data priorities of the data. It should be noted that the values indicated by the respective parameters are the natural number. There are some cases where a priority indicated by the priority parameter "p" will be referred to as a priority "p", and data priorities indicated by the data priority parameters "M" and "N" will be referred to as data priorities "M" and "N", respectively.

In this first exemplary embodiment, it is assumed that as priorities of the storage units 200, various values are set from 1 in an ascending order, that is, priorities are sequentially decreased (value "1" implies highest priority). Also, it is assumed that different priorities are set to the respective storage units 200. It should also be noted that the maximum value of those priorities is made equal to a total number of those storage units 200. Further, it is assumed that, as the data priorities of the data, various values are set from 1 in an ascending order, that is, data priorities are sequentially decreased (value "1" implies highest data priority). It is also assumed that the maximum value of the data priorities is equal to an "L" (symbol "L" being natural number).

Firstly, the storing destination control unit 101 initializes the priority parameter "p" and the data priority parameter "M" as the highest priority value and the highest data priority, respectively (Step A01). In this case, it is set that p=1 and M=1. Next, a processable flow rate (which implies remaining processable flow rate) of the storage unit 200 having the priority "p" is acquired (Step A02). It should also be noted that the storing destination control unit 101 retrieves an identification number of the storage unit 200 having the priority "p" from the storage unit priority table 105, and then, specifies the processable flow rates of the respective storage units 200 acquired in Step S005 by utilizing the retrieved identification number so as to obtain the processable flow rate of the storage unit 200 having the priority "p". In this case, it is assumed that the value of the processable flow rate obtained by the storing destination control unit 101 is "X".

Next, the storing destination control unit 101 initializes another data priority parameter "N" to become equal to the value of the data priority parameter "M" (Step A03). It should also be noted that both data priority parameters "M" and "N" represent a range of the data priorities (namely, symbol "M" corresponds to starting point, and symbol "N" corresponds to end point). Next, the storing destination control unit 101 calculates a total value of flow rates of data having the data priority equal to or larger than "M" and equal to or smaller than "N", and thereafter, judges whether or not this total value is larger than "X" (namely, processable flow rate of storage unit having priority "p") (Step A04). It should also be noted that the flow rates of the respective data having the data priority equal to or lager than "M" and equal to or smaller than "N" may be obtained as follows. That is, the storing destination control unit 101 retrieves identification numbers from the data priority table 104, while the identification numbers correspond to classes of data pieces to which data priorities equal to or larger than the data priority "M" and equal to or smaller than the data priority "N" are attached. Then, the storing destination control unit 101 specifies the data flow rates for each class of the data acquired by this storing destination control unit 101 in Step S004, by utilizing those retrieved identification numbers.

In this case, if a total value of flow rates of data having the data priority equal to or larger than "M" and equal to or smaller than "N" becomes equal to or smaller than "X" (processable flow rate of storage unit having priority "p"), then the storing destination control unit 101 extends the range of the data priorities by 1 degree (namely, adds "1" to "N"), and thereafter, repeatedly performs the processing defined in Step A04 ("No" in Step A04, and Step A06). When "N" becomes larger than "L", the ranges of all the data priorities have been confirmed. As a result, in order to define the storing destinations of the data within the previously confirmed ranges, the processing of the stream data control server advances to Step A05 ("Yes" in Step A07).

Also, if a total value of flow rates of data having the data priority equal to or larger than "M" and equal to or smaller than "N" becomes larger than "X" (processable flow rate of storage unit having priority "p") ("Yes" in Step A04), then the storing destination control unit 101 recognizes that the data having the data priorities in this range cannot be processed completely in the storage unit having the priority "p", and therefore, defines a storing destination of the data within a range smaller than the above-mentioned range by 1 degree. In other words, as the storing destination of the data having the data priority equal to or larger than "M" and equal to or smaller than "N−1", the storing destination control unit 101 selects the storage unit having the priority "p", and updates information about the data storing destination for each data priority (Step A05). It should also be noted that when M=N, since the data having this data priority (data priority "M") cannot be stored in the above-mentioned storage unit having the priority "p", the storing destination control unit 101 does not update the information about the data storing destination for each data priority.

Next, the storing destination control unit 101 sets M=N and p=p+1 in order to repeatedly perform the above-mentioned processings defined from Step A02 to Step A05 with respect to other data priorities and other storage units 200 (Step A08). This process operation is performed in order to sequentially determine storing destinations of data having data priorities within a range where the secondly lower data priority is defined as a starting point from a storage unit 200 having the secondly lower priority.

It should also be noted that, if storing destinations of data with respect to all the data priorities have already been determined before the processings defined from Step A02 up to Step A05 are repeatedly executed after Step A08, then the storing destination control unit 101 ends the processings ("Yes" in Step A09). Also, if the checking operation has already been accomplished with respect to all the storage units 200, then the above-mentioned processings are ended ("Yes" in Step A10). In other words, even when the priority "p" is larger than the total number of the storage units 200, the above-mentioned processings are ended.

It should also be noted that a control destination of stream data is a storage unit in the first exemplary embodiment, but a unit for processing such stream data is not limited only to the above-mentioned storage unit, but may be, for example, a filter unit. This alternative unit may be attached not only to the first exemplary embodiment, but also to succeeding exemplary embodiments.

According to the first exemplary embodiment, the stream data control server is configured in such a manner that, while the stream data control server refers to both the data flow rate (namely, amount of data generated per unit time) and the processable flow rates of the storage units in the order of the data priorities of the data, the stream data control server updates the storing destinations of the data at any time. As a result, even in such a case where a large amount of data is generated in a continuous manner, the possibilities of the data omissions can be reduced, and hence, the necessary data can be more reliably stored.

Figure 5:
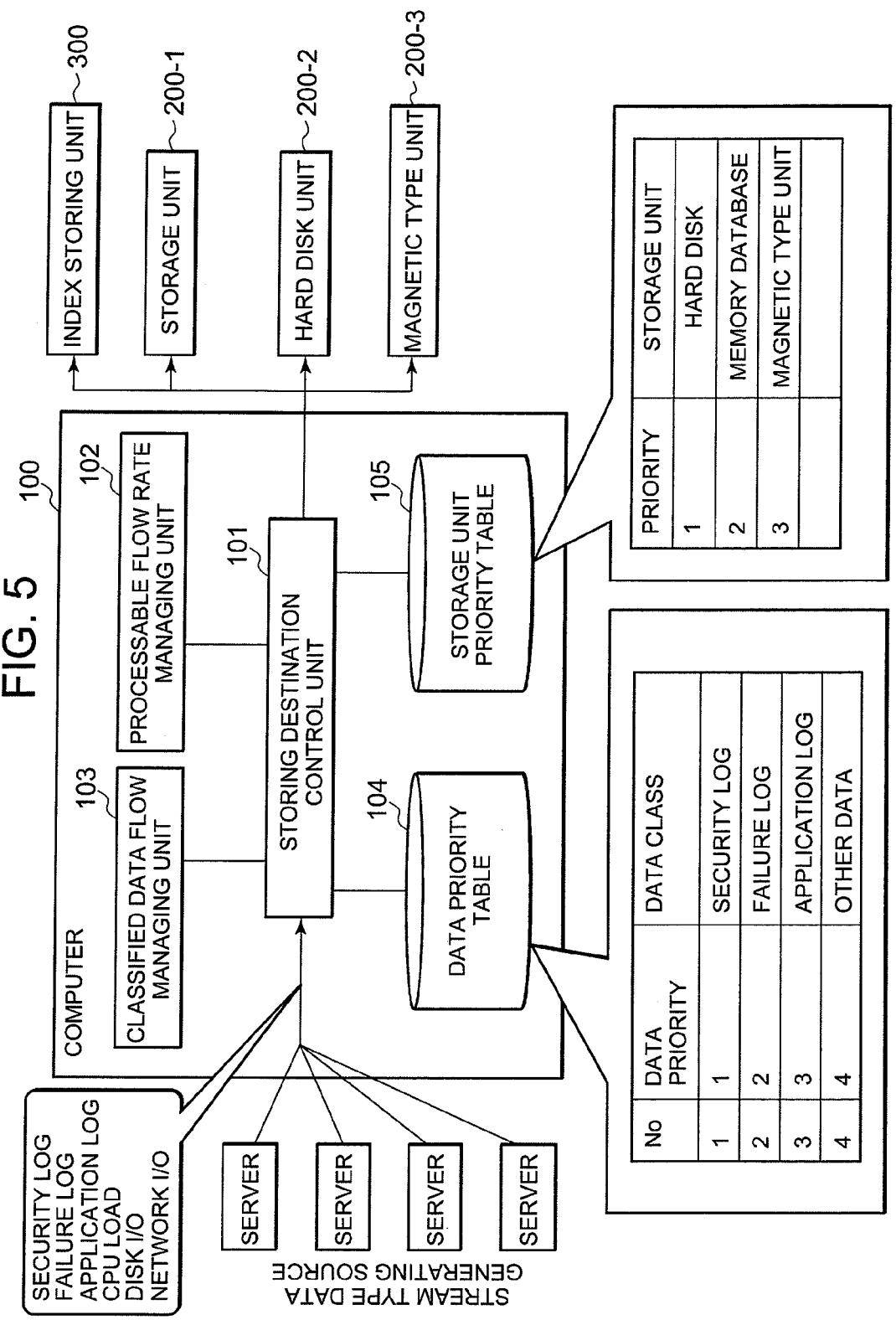
FIG. 5 is an explanatory diagram illustrating an application example in a data sensor of the first exemplary embodiment.

FIG. 5 is an application example in the data sensor of the first exemplary embodiment. In the application example shown in FIG. 5, a stream type data generating source is a large number of servers. It is assumed that, as stream type data, data pieces as to a CPU load, a network I/O, a disk I/O, a security log, an application log, and a failure log are generated in a continuous manner from each of those servers. It is also assumed that data priorities corresponding to classes of such data are higher in order of the security log, the failure log, the application log, and other items (CPU load, network I/O, disk I/O). Also, as storage units, a memory database (hereinafter, referred to as "memory database 200-1"), a database (hereinafter, referred to as "hard disk 200-2") in which data is stored on a hard disk, and a tape type archive unit (hereinafter, referred to as "magnetic tape unit 200-3") are provided. It is also assumed that priorities are higher in order of the hard disk 200-2, the memory database 200-1, and the magnetic tape unit 200-3.

Under a normal operation, all data pieces are stored in the hard disk 200-2. In this case, since a failure happens to occur and thus failure logs are rapidly increased, the following assumptions are conceived. That is, the increased failure log data exceeds the processable flow rate of the hard disk 200-2. Otherwise, a defragment processing is required in the hard disk 200-2, and hence, the processable flow rate of the hard disk 200-2 is lowered.

In those cases, in the first exemplary embodiment, the stream data control server judges that the failure log data cannot be stored in the hard disk 200-2, and therefore, performs such a control operation that the failure log data is stored in the memory database 200-1 having the secondly lower priority than that of the hard disk 200-2. As described above, since the storing destination is changed, the stream data control server can control that the temporarily and rapidly increased failure log data is stored in the memory database 200-1. The storage capacity of the memory database 200-1 is smaller than that of the hard disk 200-2, but the storing process speed of the memory database 200-1 is faster than that of the hard disk 200-2.

Seconds Exemplary Embodiment

Figure 6:
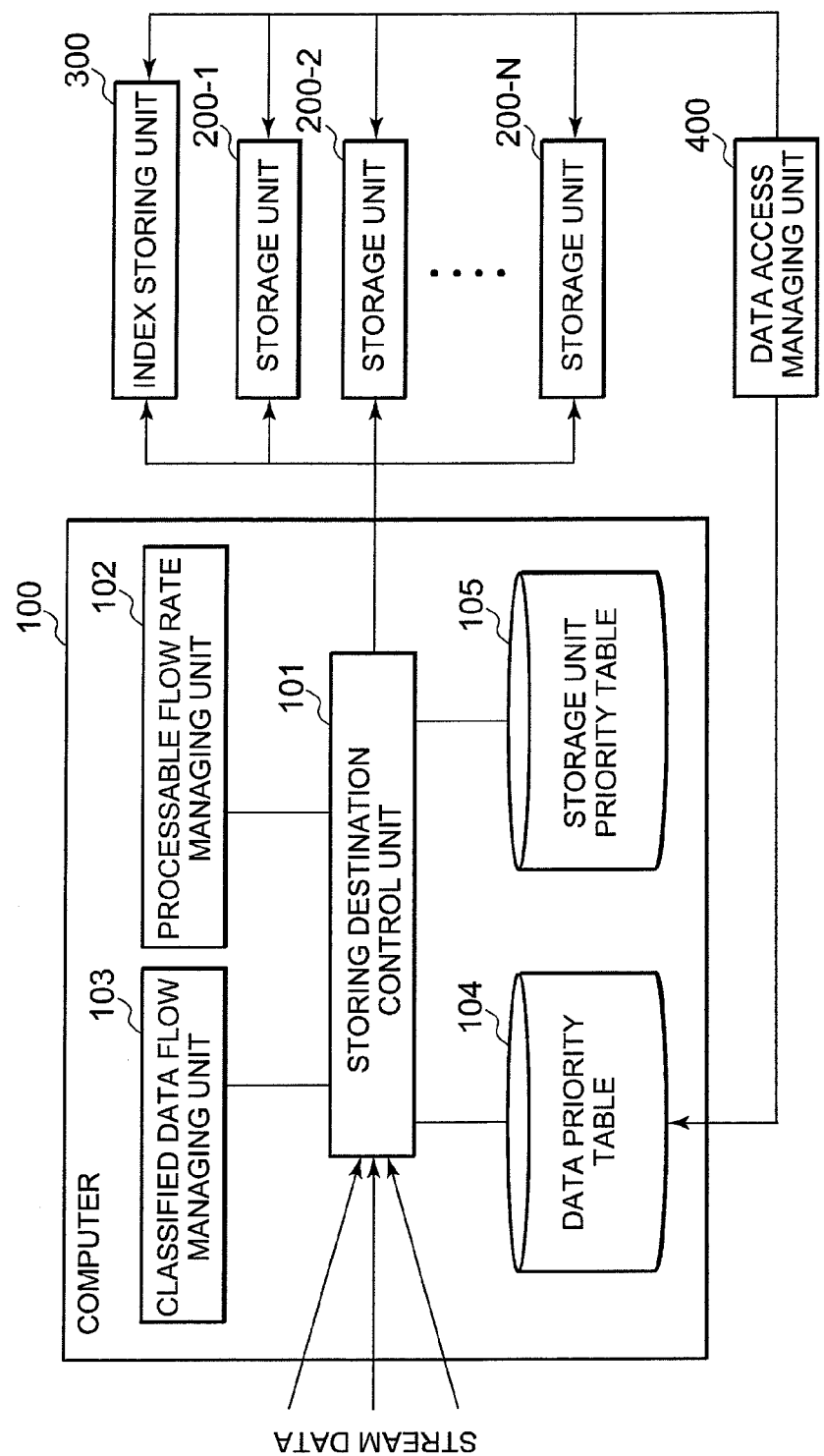
FIG. 6 is a block diagram showing a structural example of a stream data control server according to a second exemplary embodiment of the present invention.

Next, a description is made of a stream data control server according to a second exemplary embodiment of the present invention. FIG. 6 is a block diagram showing a structural example of the stream data control server according to the second exemplary embodiment. As shown in FIG. 6, the stream data control server according to the second exemplary embodiment is different from that of the first exemplary embodiment shown in FIG. 2 in that the former stream data control server is further equipped with a data access managing unit 400.

The data access managing unit 400 manages whether or not data stored in the respective storage units 200 has been accessed, and updates data priorities based upon access frequencies of the data stored in the respective storage units 200, while the updated data priorities are attached to the respective data. Concretely speaking, the data access managing unit 400 contains an access log storing unit (not shown in detail), and judges classes of accessed data so as to calculate access frequencies for each classes at predetermined timing, and then, updates corresponding relations of the data priorities in the data priority table 104 in such a manner that the higher data priorities are sequentially attached to the respective data in order of the higher access frequencies. The above-mentioned access log storing unit monitors accesses with respect to the respective storage units 200, and stores therein information for indicating when data stored in the respective storage units 200 is accessed. It should be noted that the access log storing unit may be provided in each of the storage units 200, which is independently provided irrespective of the data access managing unit 400.

Concretely speaking, the data access managing unit 400 may be realized by a central processing unit, a processor, a data processing apparatus, and a storage apparatus, which are operated under control of a program. It should also be noted that the data access managing unit 400 may be included in one of the computer 100 and an arbitrary storage unit 200 (namely, any one of storage units 200-1 to 200-N).

Figure 7:
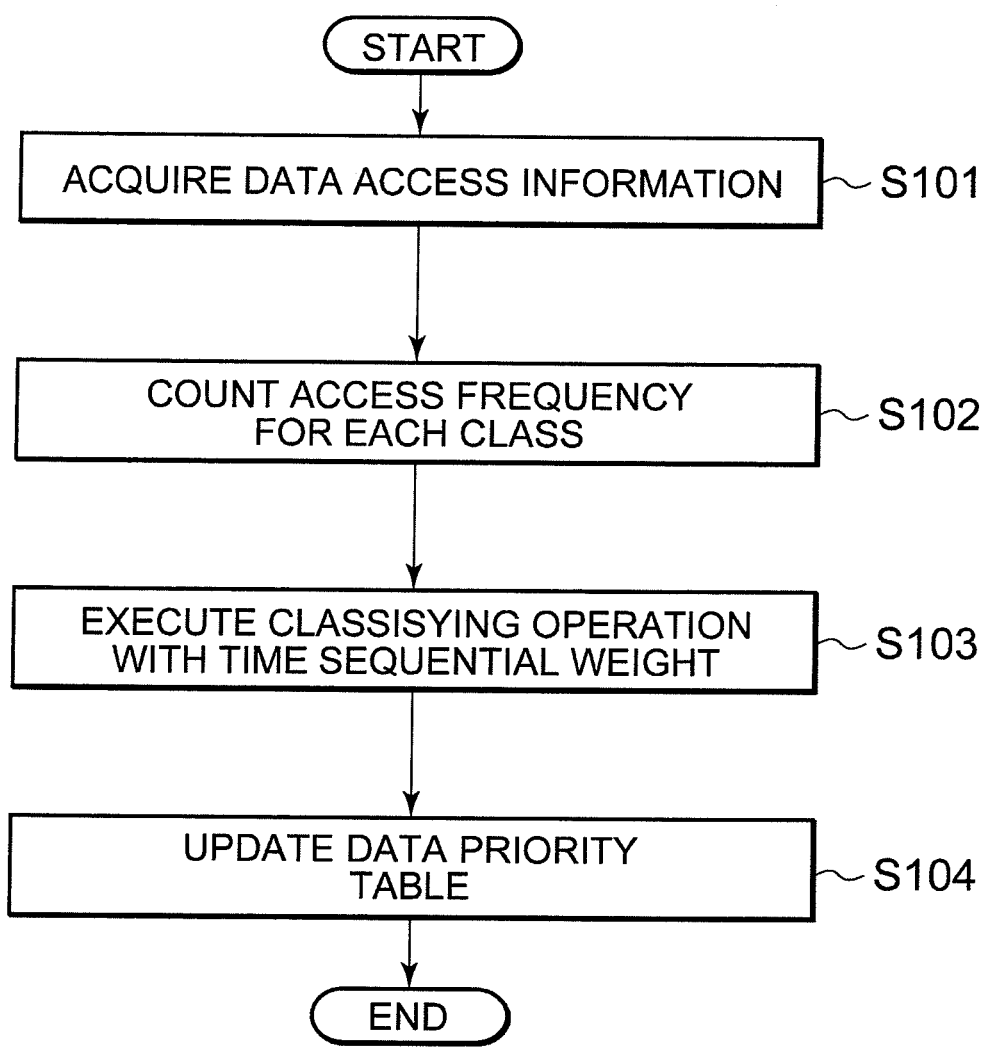
FIG. 7 is a flowchart for describing an operation example of the stream data control server according to the second exemplary embodiment of the present invention.

Next, a description is made of operations of the second exemplary embodiment. FIG. 7 is a flowchart showing an example of the operations executed by the stream data control server according to the second exemplary embodiment. It should also be noted that the operation example shown in FIG. 7 corresponds to such an operation example when the data access managing unit 400 updates the corresponding relations of the data priorities in the data priority table 104. It should also be noted that this exemplary embodiment is described by exemplifying such a case where, in the respective storage units 200, while accessing operations of each of the storage units 200 are monitored, data access information (access logs) for indicating when data stored in the relevant storage unit 200 is accessed is held.

As shown in FIG. 6, the data access managing unit 400 firstly acquires the data access information which is held in each of the storage units 200 (Step S101). The data access information may include access logs themselves, or may alternatively include such data that access information related only to a certain class of data is extracted to be modified. Next, the data access managing unit 400 counts access frequencies for each class of data (Step S102). Further, the data access managing unit 400 sorts the classes of data in ascending order of the access frequencies for each class of data (Step S103). In this counting operation, the data access managing unit 400 may alternatively add a time sequential weight with respect to the counted access frequencies in such a manner that a class of data which is currently and frequently accessed is located at an upper sorting grade. Then, the data access managing unit 400 causes the data priorities to be related to the classes of each data in such a manner that the higher data priorities are attached to the upper-sorting-graded classes according to the sorting sequence, and then, reflects (updates) the corresponding relations on the data priority table 104.

It should also be noted that, in the second exemplary embodiment, the updating operation of data storing destinations for each data priority by the storing destination control unit 101 described below is preferably carried out while an updated data priority is defined as an updating trigger.

According to the second exemplary embodiment, the stream data control server is configured such that the data priorities of the data which is frequently accessed at any time are set to the higher data priorities and are updated, and then, the data is stored in the storage units having the higher priorities in order of the data priorities thereof according to the data flow rates. As a result, even when a large amount of data is generated in a continuous manner, such data which is frequently accessed can be more reliably stored.

For instance, in the application example shown in the first exemplary embodiment, when the operation of the stream data control server is actually commenced, since the application program is under development, the fact that server engineers refer to the application log many times is revealed. For example, it is assumed that an access frequency for the security log (in this case, it is assumed as access frequency to which time sequential weight has been added) is equal to 10, an access frequency for the failure log is equal to 5, an access frequency for the application log is equal to 100, and an access frequency for the other logs is equal to 5. In such a case, in the second exemplary embodiment, while the access frequencies are sorted in order of counting operations, higher data priorities are attached to the application log, the security log, the failure log, and other logs in this order.

As described above, the stream data control server of the second exemplary embodiment can set a data priority of such data which is frequently accessed at any time to the higher data priority and can update the set higher data priority. As a result, the data (in this exemplary embodiment, application log) which is frequently accessed can be more reliably stored.

Third Exemplary Embodiment

Figure 8:
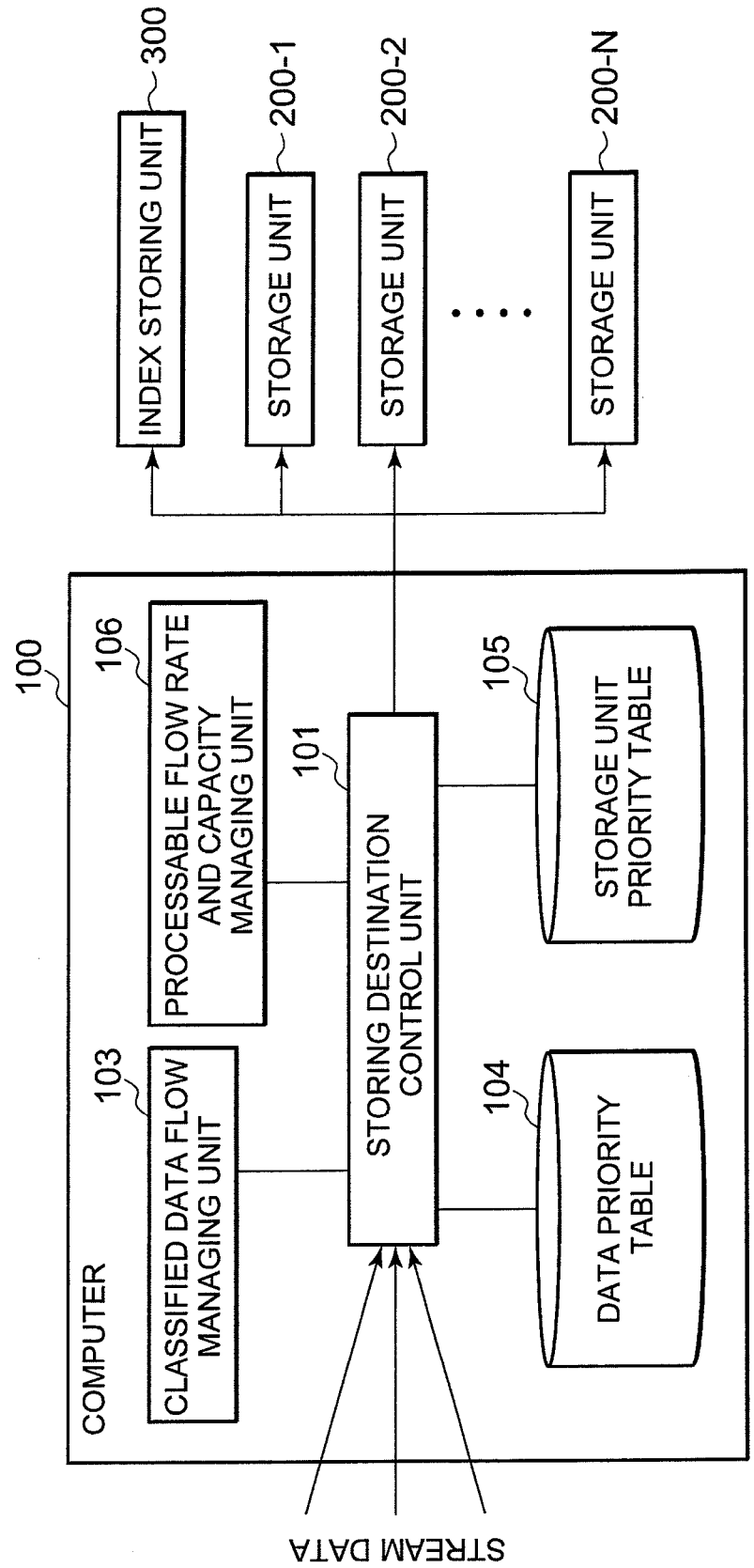
FIG. 8 is a block diagram showing a structural example of a stream data control server according to a third exemplary embodiment of the present invention.

Next, a description is made of a stream data control server according to a third exemplary embodiment of the present invention. FIG. 8 is a block diagram showing a structural example of the stream data control server according to the third exemplary embodiment. As shown in FIG. 8, the stream data control server according to the third exemplary embodiment is different from that of the first exemplary embodiment shown in FIG. 2 in that the former stream data control server is equipped with processable flow rate and capacity managing unit 106, instead of the processable flow rate managing unit 102 in the first exemplary embodiment.

The processable flow rate and capacity managing unit 106 manages not only processable flow rates of the respective storage units 200, but also storable capacities of the respective storage units 200. Concretely speaking, the processable flow rate and capacity managing unit 106 manages the processable flow rates of the respective storage units 200 by calculating the processable flow rates of the respective storage units 200 at predetermined timing based upon process performance of the respective storage units 200 and amounts of processed data thereof at this timing. Further, the processable flow rate and capacity managing unit 106 manages storable capacities of the respective storage units 200 by calculating the storable capacities of the respective storage units 200 based upon storage capacities of the respective storage units 200. It should also be noted that information (namely, information indicative of storage capacity, and information indicative of amount of processed data) which is required in order to calculate the storable capacities may alternatively be acquired in such a manner that the processable flow rate and capacity managing unit 106 refers to information which has been stored previously, or derives the information from a result of controlling data storing destinations by the stream data control server. Also, the processable flow rate and capacity managing unit 106 may acquire the information from the respective storage units 200 by using a standard network management protocol such as the simple network management protocol (SNMP), or the web-based enterprise management (WBEM).

Also, in the third exemplary embodiment, the storing destination control unit 101 controls storing destinations of the respective data pieces based upon both the processable flow rates and the storable capacities of the respective storage units 200 under management of the processable flow rate and capacity managing unit 106, and the data flow rates for each class of the data under management of the storing destination control unit 101 in such a manner that, within the processable ranges by the respective storage units 200, the data having the higher data priorities may be sequentially stored in the storage units having the higher priorities.

Figure 9:
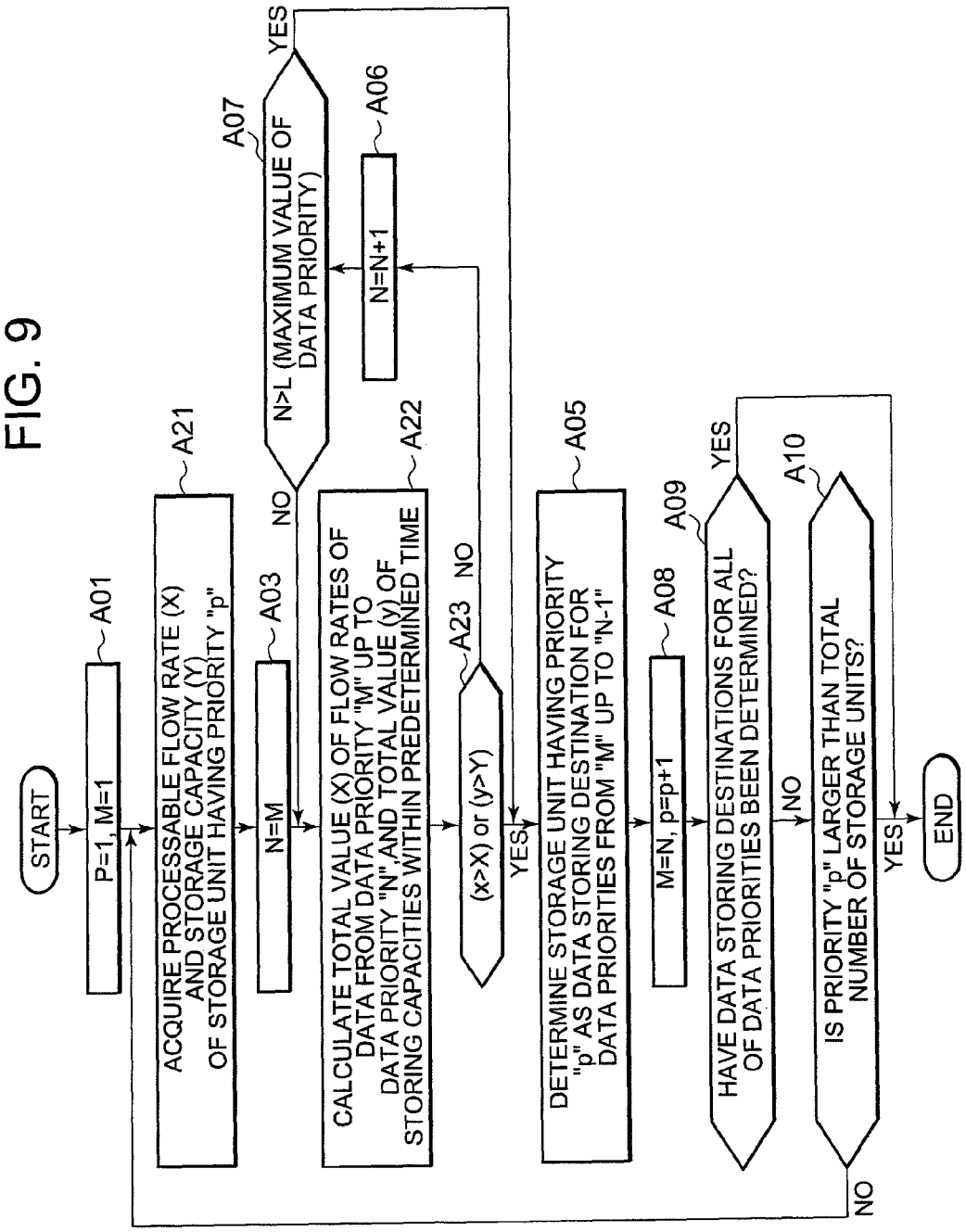
FIG. 9 is a flowchart for describing an operation example of the stream data control server according to the third exemplary embodiment of the present invention.

Next, a description is made of operations of the third exemplary embodiment. FIG. 9 is a flowchart for describing an example of the operations executed by the stream data control server according to the third exemplary embodiment. It should also be noted that the operation example shown in FIG. 9 corresponds to one example of a process flow operation (Step S006 of FIG. 3) for determining data storing destinations for each data priority, which is executed by the storing destination control unit 101 employed in the third exemplary embodiment. In FIG. 9, with respect to the same processing operations as those for determining the data storing destinations for each data priority provided in the first exemplary embodiment shown in FIG. 4, the same step numbers will be attached, and thus, descriptions thereof will be omitted.

Although not shown in this third exemplary embodiment, in Step S005 of FIG. 3, it is so assumed that the storing destination control unit 101 has already acquired both the processable flow rates and the storable capacities of the respective storage units 200 from the processable flow rate and capacity managing unit 106.

If the storing destination control unit 101 initializes both a priority parameter "p" and a data priority parameter "M" (Step A01), then the storing destination control unit 101 can acquire both a processable flow rate (this implies remaining processable flow rate) and a storable capacity (this implies remaining storable capacity) of such a storage unit 200 having the priority "p" (Step A21). It should also be noted that the storing destination control unit 101 may acquire the above-mentioned remaining processable flow rate and remaining storable capacity by such a manner that the storing destination control unit 101 retrieves an identification number of the storage unit 200 having the priority "p" from the storage unit priority table 105, and uses this retrieved identification number so as to specify the processable flow rates and the storable capacities of the respective storage units 200 acquired in Step S005. It is so assumed that a value of the processable flow rate acquired in this example is "X". It is also assumed that a value of the storable capacity is "Y".

Next, if the storing destination control unit 101 initializes another data priority parameter "N" to become equal to the value of the above-mentioned data priority parameter "M" (Step A03), then the storing destination control unit 101 calculates both a total of flow rates of data having the data priority equal to or larger than "M" and equal to or smaller than "N", and a total of amounts of data having the data priority from "M" to "N", the data being stored within a certain constant time (Step A22). In this case, it is so assumed that the calculated total value of the flow rates of data having the data priority equal to or larger than "M" and equal to or smaller than "N" is "x". Also, it is assumed that the calculated total value of the amounts of data having the data priority from "M" to "N", the data being stored within the certain constant time, is "y".

Then, the storing destination control unit 101 judges whether or not the value "x" (total value of flow rates of data having data priority equal to or larger than "M" and equal to or smaller than "N") is larger than the value "X" (processable flow rate of storage unit having priority "p"), otherwise, the value "y" (total value of amounts of data within relevant range, which should be stored within certain constant time) is larger than the value "Y" (storable capacity of storage unit having priority "p") (Step A23).

As a result of the judgment made in Step A23, if the value "x" (total value of flow rates of data having data priority equal to or larger than "M" and equal to or smaller than "N") is equal to or smaller than the value "X" (processable flow rate of storage unit having priority "p"), and in addition, the value "y" (total value of amounts of data within relevant range, which should be stored within certain constant time) is equal to or smaller than the value "Y" (storable capacity of storage unit having priority "p"), then the storing destination control unit 101 further extends the range of the data priority by one data priority (namely, 1 is added to "N"), and repeatedly performs the processings defined in Steps A22 to A23 ("No" in Step A23, and Step A06). Similarly, in this example, in such a case that "N" becomes larger than "L", the range for all of the data priorities has already been confirmed. As a result, in order to define storing destinations of data within the previous range, the processing executed by the stream data control server is advanced to Step A05 ("Yes" in Step A07).

On the other hand, if the value "x" (total value of flow rates of data having data priority equal to or larger than "M" and equal to or smaller than "N") is larger than the value "X" (processable flow rate of storage unit having priority "p"), or if the value "y" (total value of amounts of data within relevant range, which should be stored within certain constant time) is larger than the value "Y" (storable capacity of storage unit having priority "p") ("Yes" in Step A23), then the storing destination control unit 101 recognizes that the data within this range of the data priority cannot be processed in the storage unit having the priority "p", and thus, defines a storing destination of the data within such a range which is narrower than the above-mentioned range by one data priority (Step A05). It should also be noted that operations subsequent to Step A05 are similar to those of the first exemplary embodiment.

According to the third exemplary embodiment, the stream data control server is configured in such a manner that while the stream data control server refers to the data flow rate (namely, amount of data generated per unit time), and both the processable flow rates and the storable capacities of the storage units, the stream data control server updates, in order of the data priorities of the data, the storage destinations of the data at any time. As a result, even in such a case that a large amount of data is generated in a continuous manner, the possibilities of the data omissions can be reduced, and hence, the necessary data can be more reliably stored.

Fourth Exemplary Embodiment

Figure 10:
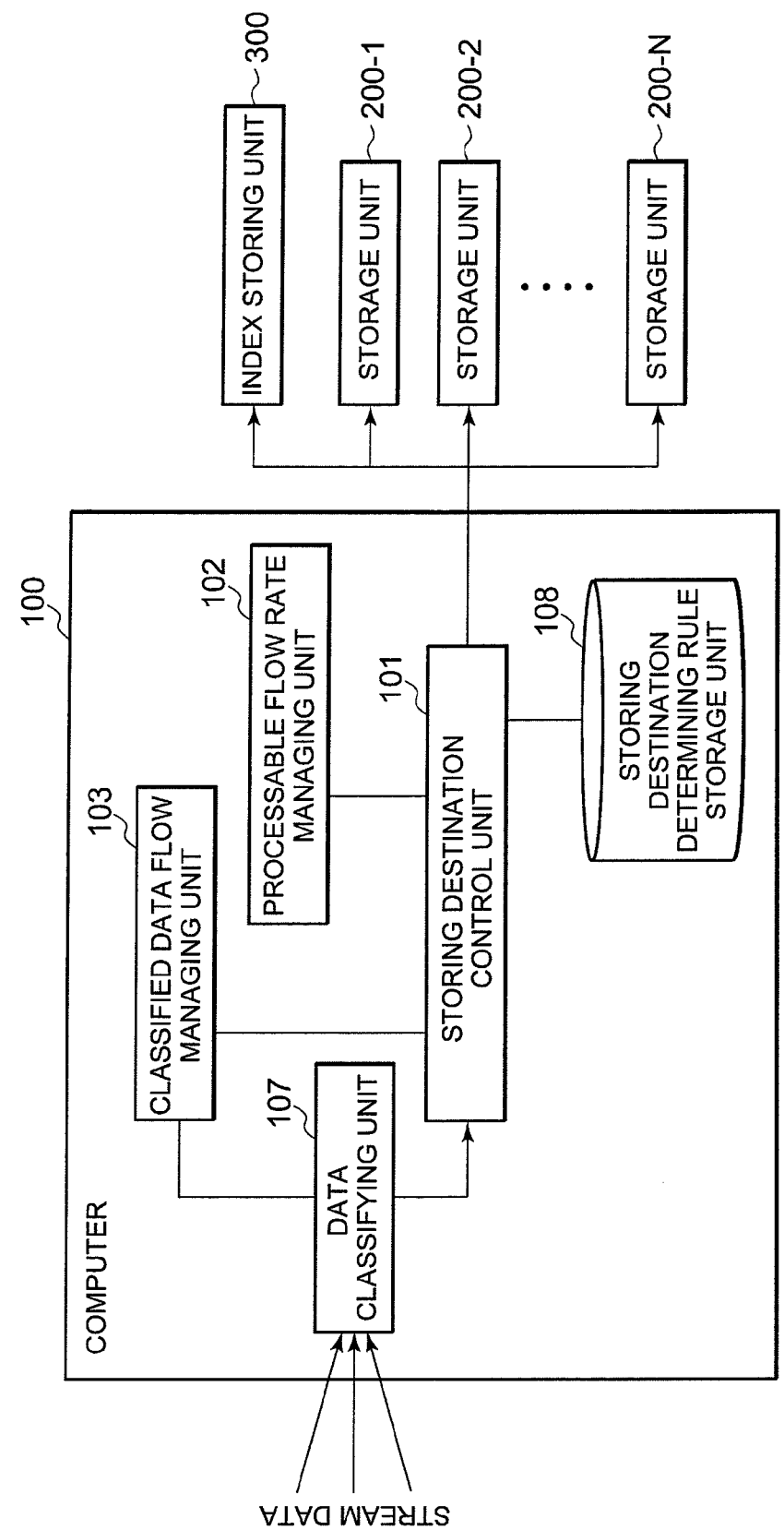
FIG. 10 is a block diagram showing a structural example of a stream data control server according to a fourth exemplary embodiment of the present invention.

Next, a description is made of a stream data control server according to a fourth exemplary embodiment of the present invention. FIG. 10 is a block diagram for showing a structural example of the stream data control server according to the fourth exemplary embodiment. As shown in FIG. 10, the stream data control server according to the fourth exemplary embodiment is different from that of the first exemplary embodiment shown in FIG. 2 in that the former stream data control server is equipped with data classifying unit 107 and a storing destination determining rule storage unit 108, instead of the above-mentioned data priority table 104 and storage unit priority table 105.

The data classifying unit 107 receives data which are generated from a stream type data generating source in a continuous manner, and classifies the received data. The data classifying unit 107 classifies data according to a class of data to which one data priority is attached. Similar to other exemplary embodiments, a "class" defined in this classification indicates a group of data which the same data priority is attached to. Any arbitrary classes may be employed which include a type of data, a character string contained in data, a data list, a range of numeral values, and the like.

The storing destination determining rule storage unit 108 defines a combination of: a class of data; a flow rate of data for each class; and a storing destination of the data with respect to processable flow rates of the respective storage units 200. Concretely speaking, the storing destination determining rule storage unit 108 corresponds to storage unit for storing therein a storing destination determining rule which is such information as to define, for each class of data to which one data priority is attached, both a condition of a system status and a storing destination of data belonging to the class in question when the condition of the system status is satisfied. The condition of the system status is defined by a value of data flow rate as to at least one class, and a value of processable flow rate of at least one storage unit.

FIG. 11 is an explanatory diagram for showing an example of the storing destination determining rule held by the storing destination determining rule storage unit 108. The example shown in FIG. 11 is such an exemplification that a total number of classes of data is two (namely "A" and "B"), and a total number of storage units is two (namely, storage unit 1 and storage unit 2). Also, symbol "a" represents a data flow rate of the data class "A", and symbol "b" represents a data flow rate of the data class "B." Also, symbol "x" represents a processable flow rate of the storage unit 1, and symbol "y" represents a processable flow rate of the storage unit 2.

In FIG. 11, there is illustrated an example where, under such a condition that the data flow rate (a) of the data class "A" is equal to or smaller than the processable flow rate (x) of the storage unit 1, the storage unit 1 has been defined as a storing destination of data belonging to the data class "A". Also, in FIG. 11, there is illustrated an example where, under such a condition where the data flow rate (a) of the data class "A" is equal to or smaller than the processable flow rate (y) of the storage unit 2, the storage unit 2 has been defined as a storing destination of data belonging to the data class "A". It should also be noted that the examples shown in FIG. 11 are defined under such a premise that the conditions are sequentially referred to beginning at the top.

The storing destination control unit 101 judges whether a system status at present, which is indicated by a combination of the processable flow rate of each of the storage units 200 and the data flow rate for each class, satisfies one of the conditions that defined by the storing destination determining rule associated with the class of each data in order to control the storing destinations of the data.

Figure 12:
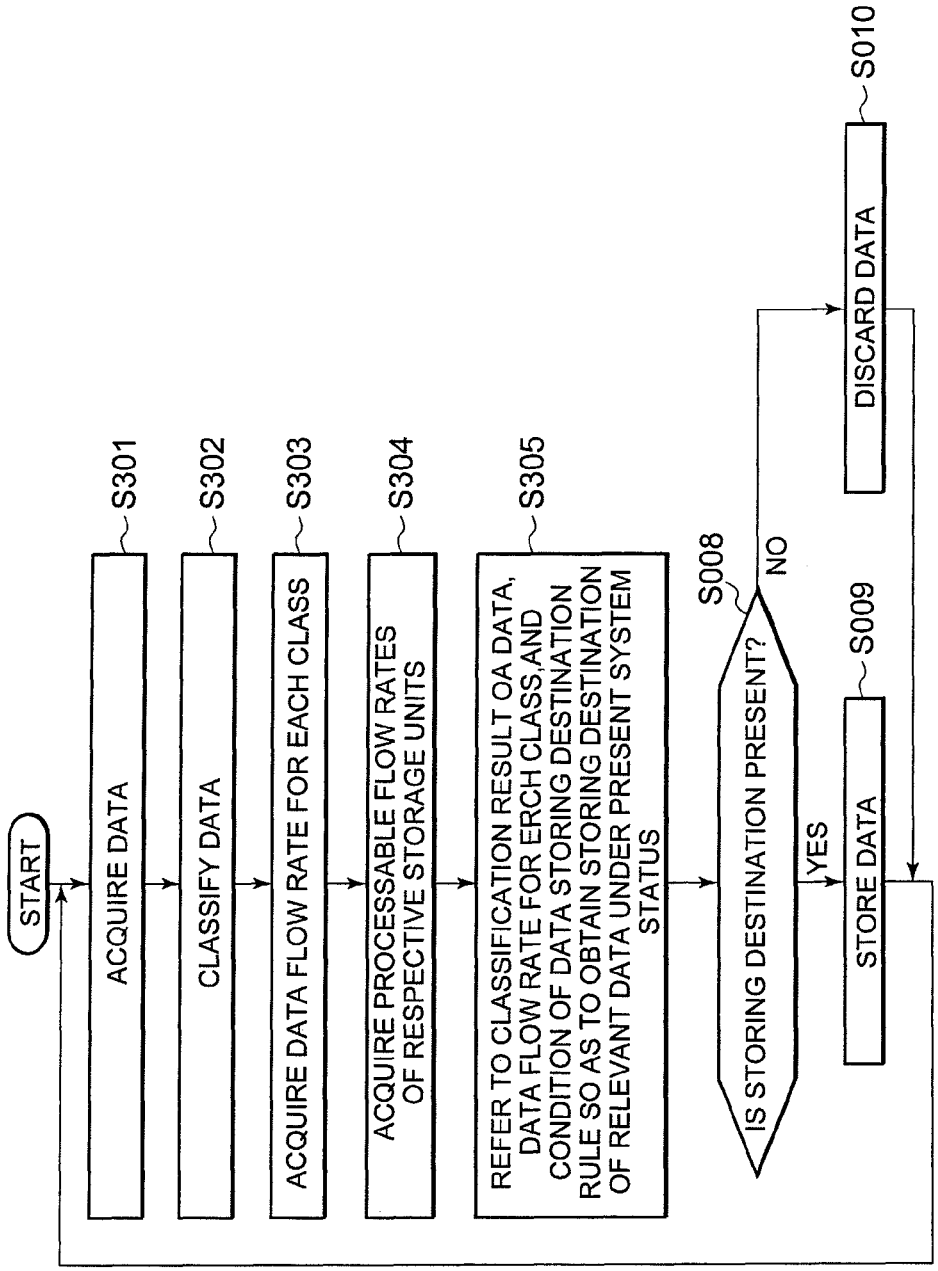
FIG. 12 is a flowchart for describing an operation example of the stream data control server according to the fourth exemplary embodiment of the present invention.

Next, a description is made of operations of the fourth exemplary embodiment. FIG. 12 is a flowchart for describing an example of the operations executed by the stream data control server according to the fourth exemplary embodiment. It should also be noted that the same step numbers as the first exemplary embodiment shown in FIG. 3 will be employed for the same process operations of the stream data control server illustrated in FIG. 12, and therefore, descriptions thereof will be omitted.

In this fourth exemplary embodiment, the data classifying unit 107 acquires (receives) each data piece of stream data generated from a stream type data generating source (Step S301). When the data classifying unit 107 acquires the each data piece, the data classifying unit 107 classifies the each received data piece according to classes of data to which one data priority is attached (Step S302). For judging which class the each data piece belongs to, for example, the following judgment may be employed: That is, the data classifying unit 107 holds such information as to associate an identification number which indicates certain class of data to which one data priority is attached with information (a pattern of data list, or character string used in pattern matching) for discriminating this class, and judges whether or not the each acquired data piece matches one of the patterns of the character string and the data list.

Next, when the data classifying unit 107 acquires the each data piece, and classifies the each data piece, the storing destination control unit 101 acquires data flow rates for each class of the each data piece at present from the classified data flow rate managing unit 103 (Step S303). Also, the storing destination control unit 101 acquires processable flow rates of the respective storage units 200 at present from the processable flow rate managing unit 102 (Step S304). It should also be noted that the classified data flow rate managing unit 103 and the processable flow rate managing unit 102 may calculate the data flow rates for each class of the data pieces, or the processable flow rates of the respective storage units 200, respectively, according to updating triggers issued at independent timings, and hold the calculated values so that the storing destination control unit 101 can acquire the processable flow rates and the data flow rates for each class at present by referring to the values held in the processable flow rate managing unit 102 and classified data flow rate managing unit 103. Alternatively, the storing destination control unit 101 may instruct the classified data flow rate managing unit 103 and the processable flow rate managing unit 102 to calculate one of the data flow rates for each class of the data pieces and the processable flow rates of the respective storage units 200 at present, and then, may acquire these processable flow rates and data flow rates at present by receiving these calculation results.

It should also be noted that the updating triggers for the data flow rates for each class of the data pieces and the processable flow rates of the respective storage units 200 may be issued, for example, every time a constant time has elapsed, every time a predetermined number of data pieces are processed, or by receiving a request issued from an operation manager of the stream data control server.

When the storing destination control unit 101 acquires both the data flow rates for each class of the data pieces and the processable flow rates of the respective storage units 200 at present, the storing destination control unit 101 determines a storing destination of the each data piece based upon the system status indicated by the acquired information, the data priority of the acquired data, and the storing destination determining rule (Step S305). For example, the storing destination control unit 101 may sequentially compare the system status at present with the conditions of the storing destination determining rules which have been defined with respect to the classes of data beginning at the top so as to obtain the storing destination for the class of the acquired data pieces under the system status at present.

In this stage, if the storing destination control unit 101 determines the storing destination, then the storing destination control unit 101 stores the acquired data pieces in a storage unit 200 which is indicated as the storing destination ("Yes" in Step S008 and Step S009). On the other hand, if the storing destination control unit 101 does not determine the storing destination, then the storing destination control unit 101 discards the acquired data pieces ("No" in Step S008 and Step S010).

According to the fourth exemplary embodiment, the stream data control server is configured to monitor the system status by referring to the data flow rates for each class of the data and the processable flow rates of the respective storage units, and to determine the storing destination of the data in accordance with the rules in which the data storing destinations of the data have been described according to the system statuses. As a result, while no specific attention is paid to the data priorities of the data on the side of the above-mentioned stream data control server, the possibilities of the data omissions can be reduced, and hence, the necessary data can be more reliably stored.

Fifth Exemplary Embodiment

Figure 13:
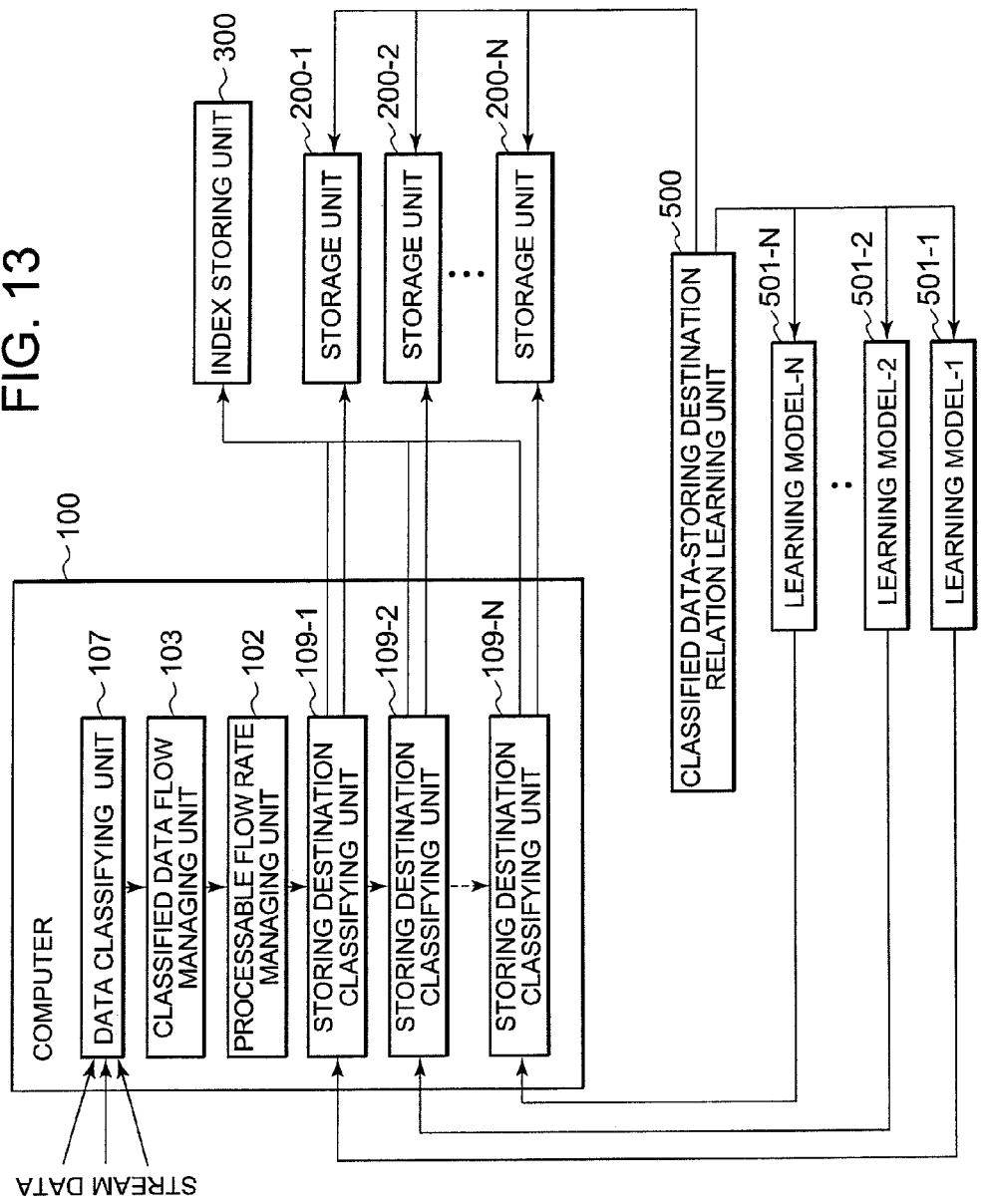
FIG. 13 is a block diagram showing a structural example of a stream data control server according to a fifth exemplary embodiment of the present invention.

Next, a description is made of a stream data control server according to a fifth exemplary embodiment of the present invention. FIG. 13 is a block diagram showing a structural example of the stream data control server according to the fifth exemplary embodiment. As shown in FIG. 13, the stream data control server is equipped with a computer 100, a plurality of storage units 200 (200-1 to 200-N) which store therein data, an index holding unit 300, and a data classification-storing destination relation learning unit 500. Also, the computer 100 contains data classifying unit 107, processable flow rate managing unit 102, classified data flow rate managing unit 103, and storing destination classifying units 109 (109-1 to 109-N) which correspond to the respective storage units 200 (200-1 to 200-N).

It should be noted that the stream data control server according to the fifth exemplary embodiment is different from that of the fourth exemplary embodiment shown in FIG. 10 in that the former stream data control server is equipped with the data classification-storing destination relation learning unit 500 and the storing destination classifying units 109 (109-1 to 109-N) which correspond to the respective storage units 200 (200-1 to 200-N) instead of both the storing destination control unit 101 and the storing destination determining rule storage unit 108. Each of the storing destination classifying units 109 corresponds to one of realizing unit of the storing destination control unit 101.

The data classification-storing destination relation learning unit 500 learns, at predetermined timing, a correlation between the respective storage units 200 and classes of data which have been stored in the respective storage units 200 under a condition of a system status which is defined by processable flow rates of the respective storage units 200 and data flow rates for each class of data at present, and thus, produces learning models 501 (501-1 to 501-N) which are utilized by the respective storing destination classifying units 109. In this case, the learning model 501 implies a model for judging whether or not data belonging to each of classes is stored in each of the storage units 200 based upon a condition of a system status. For example, the learning model 501 may imply an embodiment of a predetermined judging model (information indicative of calculating method such as calculation formula) by determining a parameter and a condition. It should also be noted that the data classification-storing destination relation learning unit 500 may be provided with storage unit for storing therein the respective learning models 501 (501-1 to 501-N).

Concretely speaking, the data classification-storing destination relation learning unit 500 is realized by a central processing unit, a processor, and a data processing unit, which are operated under control of a program, and a storage unit for storing therein learning models 501 which correspond to the respective storing destination classifying units 109. Alternatively, it should also be noted that one of the data classification-storing destination relation learning unit 500 and the unit for storing therein the learning models 501 corresponding to the respective storing destination classifying units 109 may be contained in one of the computer 100 and an arbitrary storage unit 200 (any one of storage units 200-1 to 200-N).

Each of the storing destination classifying units 109 judges whether or not data is stored in the corresponding storage unit 200 under a condition of a system status which is defined by the processable flow rates of the respective storage units 200 and the data flow rates for each class at present in accordance with a learning model 501 produced in correspondence with the relevant storing destination classifying unit 109. Concretely speaking, each of the storing destination classifying unit 109 judges whether or not the data is stored in the corresponding storage unit 200 by applying the system status to the learning model 501 produced by the data classification-storing destination relation learning unit 500. The above-mentioned system status is defined by the processable flow rates of the respective storage units 200 and the data flow rates for each class at present.

As the learning model 501, for example, a support vector machine (SVM) may be employed. This SVM implies such a learning model capable of solving a discrimination problem, namely corresponds to such a model as to discriminate each of samples, which is expressed as one point in an n-dimensional space (called as "feature space"), as any one of two classes "A" and "B". In the case where the SVM is applied to the fifth exemplary embodiment, each of data classes is converted into a vector, and with respect to data stored in each of the storage units 200, whether storing a particular data piece in a particular storage unit is correct or incorrect is provided, as learning data, to the data classification-storing destination relation learning unit 500. Since the data classification-storing destination relation learning unit 500 learns the learning data for every storage unit, the data classification-storing destination relation learning unit 500 enables each of the storing destination classifying units 109 to discriminate whether or not storing data of a certain class in the corresponding storage unit 200 under a certain system status is correct. It should also be noted that in this fifth exemplary embodiment, the following initial condition has been employed: That is, a data priority of the initial data is unknown, and data is stored in the respective storage units 200 in a manual manner. Alternatively, another method may also be applied to the fifth exemplary embodiment. That is, with the control method described in other exemplary embodiments, the stream data control server may perform the control operation for the storing destinations in accordance with the data priorities determined to the respective data pieces for a predetermined time period, and thereafter, may change the above-mentioned control method into the control method for the storing destinations according to the fifth exemplary embodiment.

Figure 14:
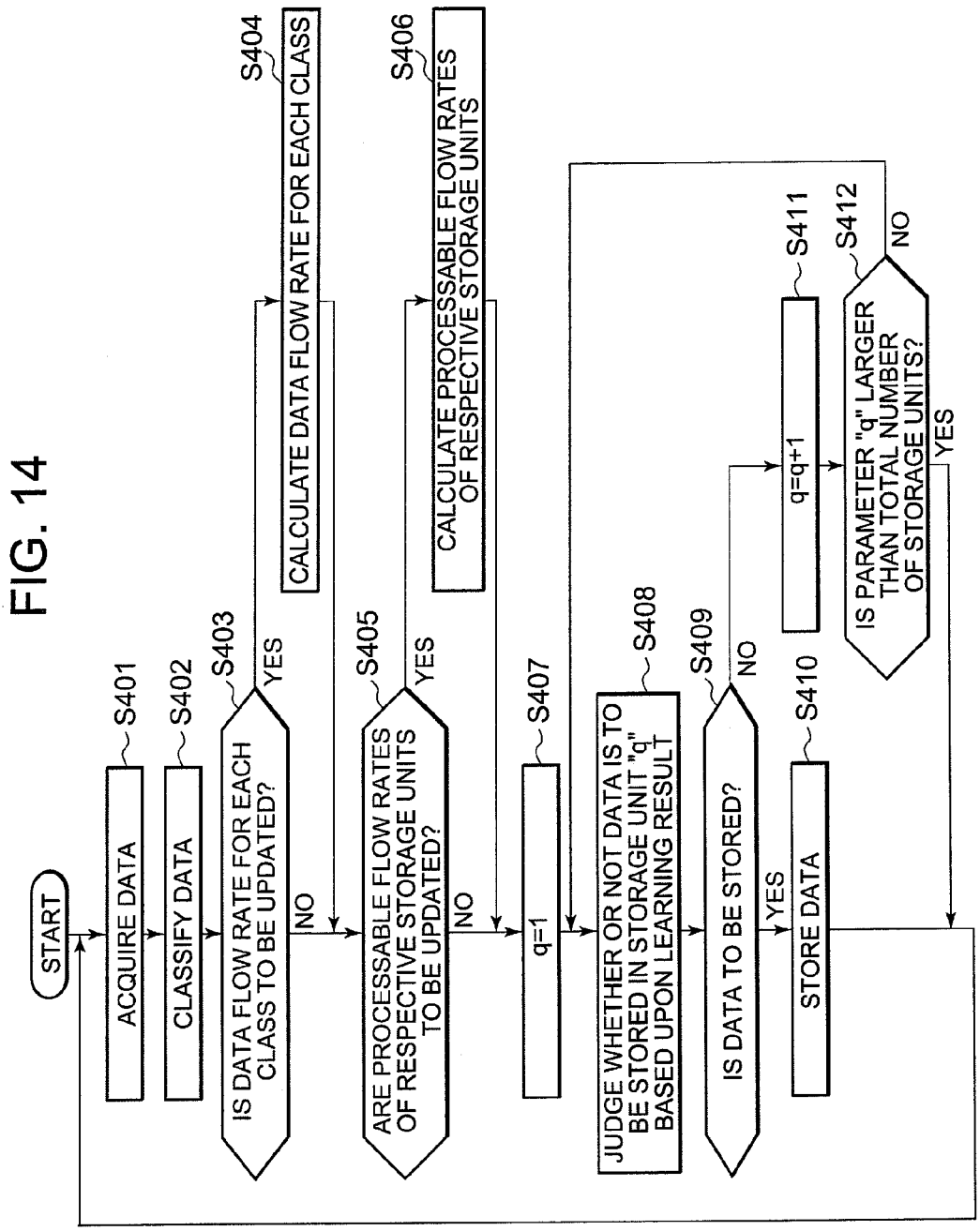
FIG. 14 is a flowchart for describing an operation example of the stream data control server according to the fifth exemplary embodiment of the present invention.
Figure 15:
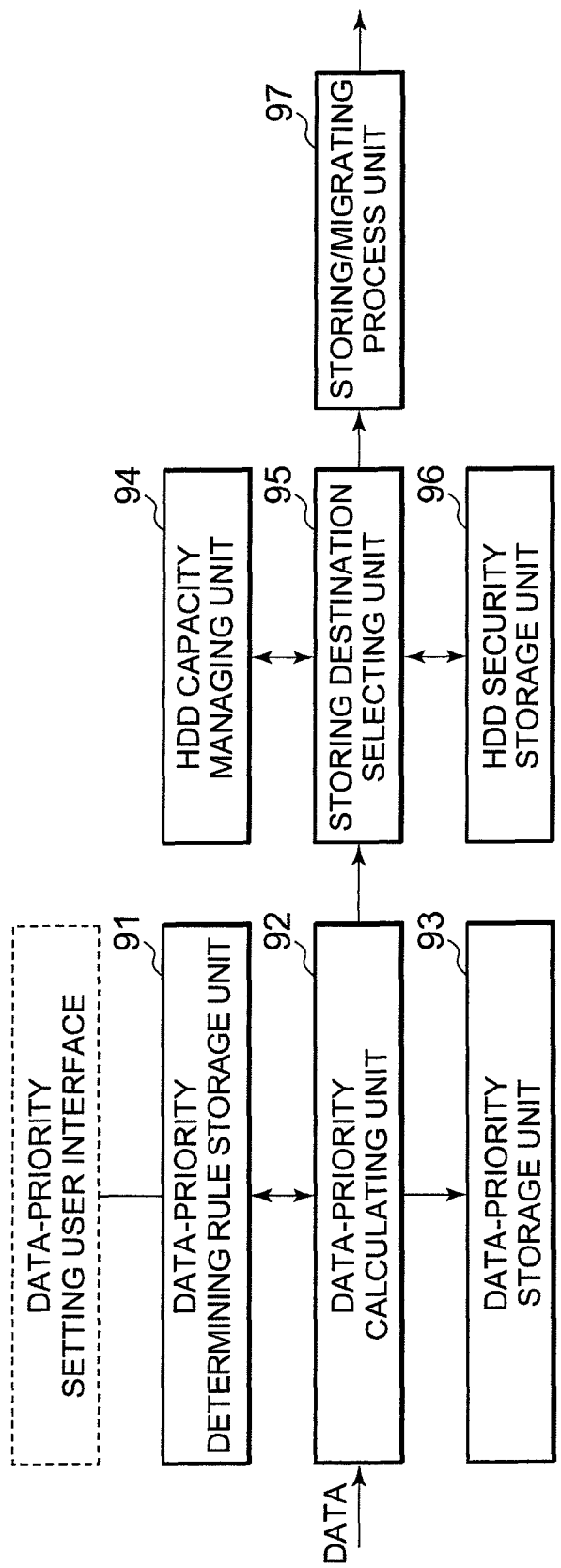
FIG. 15 is a block diagram illustrated in JP 2003-006005 A as a structural example of a data storage unit.
Figure 16:
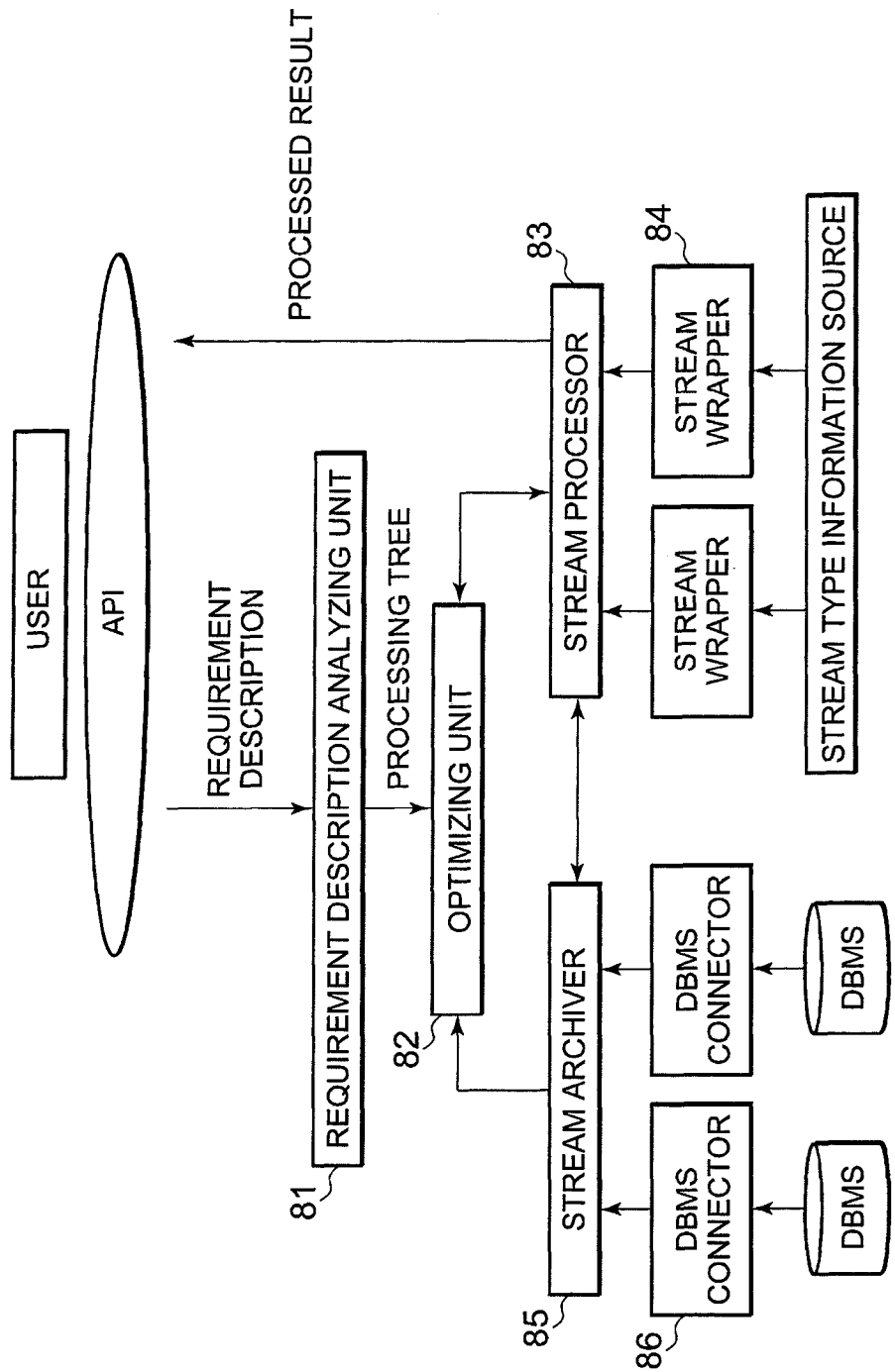
FIG. 16 is a block diagram illustrated in "An optimization method for multiple persistency requirements on stream management system" by Yamada et al. 2007, Japanese Electronic Information Communication Institute Data Engineering Workshop (DEWS) as a structural example of a stream management system.

Next, a description is made of operations of the fifth exemplary embodiment. FIG. 14 is a flowchart for describing an example of the operations executed by the stream data control server according to the fifth exemplary embodiment. It is so assumed that the generating process of the learning models 501 has been previously carried out.

Firstly, the data classifying unit 107 acquires (receives) each data piece of stream data generated from a stream type data generating source (Step S401). When the data classifying unit 107 acquires the data pieces, the data classifying unit 107 classifies the received data according to classes of data to which one data priority is attached (Step S402). It should also be noted that the data acquiring operation and the data classifying operation by the data classifying unit 107 are carried out in a similar manner to those of the fourth exemplary embodiment.

Next, the classified data flow rate managing unit 103 judges whether or not to update a data flow rate for each class of the data (Step S403). It should also be noted that the updating trigger for the data flow rate for each class of the data may be issued, for example, every time a constant time has elapsed, every time a predetermined number of data pieces are processed, or by receiving a request issued from an operation manager of the stream data control server. In this case, in such a case where the data flow rate for each class of the data is updated, the classified data flow rate managing unit 103 calculates a data flow rate at present based upon the classified class of the data, and updates the calculated data flow rate (Step S404). For instance, the classified data flow rate managing unit 103 calculates the data flow rate based upon a total data acquisition number of classified data per unit time when the stored data flow rate is calculated, or the acquisition time instant with respect to a predetermined number of data pieces, which is to serve as the updating trigger the data priority.

Also, the processable flow rate managing unit 102 judges whether or not to update processable flow rates of the respective storage units 200 (Step S405). It should also be noted that the updating triggers for the processable flow rates of the respective storage units 200 may be issued, for example, every time a constant time has elapsed, every time a predetermined number of data pieces are processed, or by receiving a request issued from an operation manager of the stream data control server. In this case, in such a case where the processable flow rates of the respective storage units 200 are updated, the processable flow rate managing unit 102 calculates a processable flow rate based upon both process performance and a amount of processed data at present with respect to each of the storage units 200, and updates the calculated processable flow rate (Step S406). For instance, the processable flow rate managing unit 102 calculates an existing processable flow rate based upon the amount of data (Xcurrent) processed per unit time, which has been acquired by employing such means as WBEM or SNMP; and further, a maximum value (Xmax) of a catalog-listed value given as a set value and amounts of processable data per unit time, which have been measured by a load test or a benchmark test.

When the processing for updating/judging both the data flow rate for each class of the data and the processable flow rates of the respective storage units 200 is accomplished, the respective storing destination classifying units 109 sequentially judge whether or not to store the each data pieces. For example, control unit (not shown) which controls the respective storing destination classifying units 109 initializes a control parameter "q" indicative of an identification number of a storage unit in order that the control parameter "q" indicates a storage unit which is judged first (Step S407). In this case, the control unit initializes the control parameter "q" to satisfy "q"=1. Hereinbelow, the storage unit indicated with the control parameter "q" is referred to as a storage unit "q". Next, the control unit causes a storing destination classifying unit 109 corresponding to the storage unit "q" to judge whether or not to store the each data pieces in the own storage unit "q" (Step S408). In this step, the storing destination classifying unit 109 (namely, storing destination classifying unit 109-$q$) corresponding to the storage unit "q" judges whether or not to store the above-mentioned data in this storage unit "q" under condition of the present system status by employing the learning model 501 (namely, learning model 501-$q$) learned with respect to the storage unit "q".

If the storing destination classifying unit 109-$q$ judges that the relevant data is to be stored, then the storing destination classifying unit 109-$q$ stores this data in the storage unit "q" ("Yes" in Step S409 and Step S410). On the other hand, if the control unit judges that the relevant data is not to be stored, then the control unit adds "1" to the control parameter "q" in order to check whether or not to store this data in the subsequent storage unit, and then, the processing of the stream data control server is returned to the previous Step S408 ("No" in Step S409 and Step S411). It should also be noted that before returning back to the above-mentioned Step S408, the control unit checks whether or not the subsequent storage unit is present (Step S412); if the subsequent storage unit is not present, then the control unit finishes the storing destination control operation as to the relevant data pieces without storing these data pieces in another storage unit; and thereafter, the processing of the stream data control unit is returned to Step S401 in order to process the next data ("Yes" in Step S412).

According to the fifth exemplary embodiment, the stream data control server is constructed as follows: While the stream data control server refers to both the data flow rate corresponding to the amount of data generated per unit time and the processable flow rates of the storage units so as to monitor the system status, the stream data control server determines the storing destination of the data in accordance with the classifying units which has learned the storing destinations of the data according to the respective system statuses. As a result, the necessary data can be more reliably stored according to various classes of system statuses.

It should be noted that the above-mentioned exemplary embodiments describe the structure of a stream data control server for storing inputted data in any one of a plurality of storage units (for instance, storage units 200-1 to 200-N), including: processable flow rate managing unit (for example, processable flow rate managing unit 102) which manages a processable flow rate corresponding to an amount of data per unit time, which can be processed in each of the plurality of storage units; classified data flow rate managing unit (for example, classified data flow rate managing unit 103) which manages a data flow rate corresponding to an amount of data processed per unit time for each class of data to which a data priority is attached; and storing destination control unit (for example, storing destination control unit 101) which controls storing destinations of respective data based upon the processable flow rate of each of the plurality of storage units and the data flow rate for each class in such a manner that the data having higher data priorities are stored in the storage units having higher priorities within a range of the processable flow rate of each of the plurality of storage units.

Also, the above-mentioned exemplary embodiments describe the structure of the stream data control server further including storing destination information storage unit (for instance, index storing unit 300) which stores therein information for indicating in which of the plurality of storage units the respective data is stored.

Also, the above-mentioned exemplary embodiments describe the structure of the stream data control server (for instance, refer to first exemplary embodiment), in which: the storing destination control unit determines one of the plurality of storage unit as a storing destination for each data priority of data at predetermined timing based upon the processable flow rate of each of the plurality of storage units and the data flow rate for each class; and the storing destination control unit judges a data priority of data for the respective data, and controls the storing destinations of the data in accordance with the storing destination for each data priority which has been determined at present.

Also, the above-mentioned exemplary embodiments describe the structure of the stream data control server (refer to, for instance, fourth exemplary embodiment) further including: storing destination determining rule storage unit (for example, storing destination determining rule storage unit 108) which stores therein a storing destination determining rule corresponding to information which defines a combination of a class of data to which a data priority is attached, a condition of a system status indicated by a value of a data flow rate for at least one class and a value of a processable flow rate for at least one storage unit, and a storing destination of data belonging to the class when the class of data satisfies the condition; and data classifying unit (for example, data classifying unit 107) which classifies the data by the class. In the structure, the classified data flow rate managing unit calculates a data flow rate for each class of data which is classified by the data classifying unit, and the storing destination control unit controls the storing destination of each data by judging whether a system status at present, which is indicated by a combination of the processable flow rate of each of the plurality of storage units managed by the processable flow rate managing unit and the data flow rate for each class managed by the classified data flow rate managing unit, satisfies one of the conditions that defined by the storing destination determining rule associated with the class of the data.

Also, the above-mentioned exemplary embodiments describe the structure of the stream data control server (refer to, for instance, second exemplary embodiment) further including: data priority information storage unit (for example, access log storing unit) which stores therein information used to judge a class of data to which a data priority is attached, and a data priority which is attached to a data belonging to the class in correspondence with each other; access information storage unit which stores therein information for indicating when data stored in each of the plurality of storage units was accessed; and data priority updating unit (for example, data access managing unit 400) which judges classes of the accessed data so as to calculate an access frequency for each class, and which updates the data priorities stored in the data priority information storage unit in such a manner that higher data priorities are attached in order of data having higher access frequencies. In the structure, the storing destination control unit judges a data priority of data based upon the information stored in the data priority information storage unit.

Also, the above-mentioned exemplary embodiments describe the structure of the stream data control server (refer to, for instance, fifth exemplary embodiment) further including learning model producing unit (for example, data classification-storing destination relation learning unit 500) which learns a correlation between each of the plurality of storage units and the class of data stored in each of the plurality of storage units at predetermined timing under a condition of a system status which is indicated by the processable flow rate of each of the plurality of storage units and the data flow rate for each class at present so as to produce a learning model, the learning model being employed in order to judge whether or not data belonging to each of the classes is to be stored in each of the plurality of storage units under the condition of the system status. In the structure, the storing destination control unit is provided in correspondence with each of the plurality of storage units, and is realized by judging unit (for example, storing destination classifying units 109-1 to 109-N) which judges whether or not the data is to be stored in the corresponding storage unit in accordance with the learning model produced by the learning model producing unit under the condition of the system status which is indicated by the processable flow rate of each of the plurality of storage units and the data flow rate for each class at present.

Also, the above-mentioned exemplary embodiments describe the structure of the stream data control server (refer to, for instance, first exemplary embodiment), in which: the processable flow rate managing unit calculates the processable flow rate of each of the plurality of storage units based upon process performance and a amount of processed data of each of the plurality of storage units at predetermined timing so as to manage the processable flow rate of each of the plurality of storage units; and the classified data flow rate managing unit calculates the data flow rate for each class of data based upon the classes of data which have been so far acquired and a data acquisition time at predetermined timing so as to manage the data flow rates for each class.

Also, the above-mentioned exemplary embodiments describe the structure of the stream data control server (refer to, for instance, third exemplary embodiment), in which: the processable flow rate managing unit calculates storable capacity of each of the plurality of storage units based upon storage capacity and an amount of processed data of each of the plurality of storage units at predetermined timing so as to manage the storable capacity of each of the plurality of storage units; and the storing destination control unit controls the storing destinations of the respective data based upon the processable flow rate and the storable capacity of each of the plurality of storage units, and also, the data flow rate for each class in such a manner that data having higher data priorities are stored in order in storage units having higher priorities within such a range of the processable flow rate and the storable capacity of each of the plurality of storage units.

Also, the above-mentioned exemplary embodiments describe the structure of the stream data control server (refer to, for instance, first exemplary embodiment), in which the processable flow rate calculating unit acquires information required for calculating one of the processable flow rate and the storable capacity by employing a network management protocol.

Also, the above-mentioned exemplary embodiments describe the structure of a stream data control server for processing inputted data by any one of a plurality of processing units, including: processable flow rate managing unit which manages a processable flow rate corresponding to an amount of data per unit time, which can be processed in each of the plurality of processing units; classified data flow rate managing unit which manages a data flow rate corresponding to an amount of data processed per unit time for each class of data to which a data priority is attached; and processing destination control unit which controls processing destinations of respective data based upon the processable flow rate of each of the plurality of processing units and the data flow rate for each class in such a manner that the data having higher data priorities are processed by the processing units having higher priorities within a range of the processable flow rate of each of the plurality of processing units. It should also be noted that as previously described in the first exemplary embodiment, the above-mentioned exemplary embodiment is equivalent to an exemplary embodiment which is realized by employing a filter unit, instead of the storage unit.

The present invention may be suitably applied to such a server which is required to process data generated in a continuous manner. For instance, the present invention may be applied to a data storing server which stores therein data such as logs which are generated in a continuous manner, and further, a data filter server which transfers a large amount of generated data.

The present invention has been described in detail. However, it should be appreciated that various changes may be made to the present invention without departing from its spirits and be covered by the claims.

Further it is the inventor's intent to retain all equivalents of the claimed invention even if the claims are amended later during prosecution.

What is claimed is:

1. A stream data control server for storing inputted received data in any one of a plurality of storage units, comprising:
means for managing a processable flow rate corresponding to an amount of data per unit time, which can be processed in each of the plurality of storage units;
means for calculating a data flow rate of the received data corresponding to an amount of the received data per unit time for each class of data to which a data priority is attached;
means for controlling storing destinations of respective data based upon the processable flow rate of each of the plurality of storage units and the data flow rate for each class such that the data having higher data priorities are stored in the storage units having higher priorities within a range of the processable flow rate of each of the plurality of storage units;
means for storing data priority information which stores therein information used to judge a class of data to which a data priority is attached, in correspondence with a data priority which is attached to a data belonging to the class;
means for storing access information which stores therein information for indicating when data stored in each of the plurality of storage units was accessed; and
means for updating a data priority which judges classes of the accessed data so as to calculate an access frequency for each class, and which updates the data priorities stored in the means for storing data priority information so that higher data priorities are attached in order of data having higher access frequencies, wherein the means for controlling storing destinations receives the data, then judges a class of the received data, and attaches priority of the received data based upon the class of the data, referring to the information stored in the means for storing data priority information.

2. A stream data control server for storing inputted received data in any one of a plurality of storage units, comprising:

a processable flow rate managing unit which manages a processable flow rate corresponding to an amount of data per unit time, which can be processed in each of the plurality of storage units;

a classified data flow rate managing unit which calculates a data flow rate of the received data corresponding to an amount of the received data per unit time for each class of data to which a data priority is attached;

a storing destination control unit which controls storing destinations of respective data based upon the processable flow rate of each of the plurality of storage units and the data flow rate for each class in such a manner that the data having higher data priorities are stored in the storage units having higher priorities within a range of the processable flow rate of each of the plurality of storage units;

a data priority information storage unit which stores therein information used to judge a class of data to which a data priority is attached, in correspondence with a data priority which is attached to a data belonging to the class;

an access information storage unit which stores therein information for indicating when data stored in each of the plurality of storage units was accessed; and a data priority updating unit which judges classes of the accessed data so as to calculate an access frequency for each class, and which updates the data priorities stored in the data priority information storage unit so that higher data priorities are attached in order of data having higher access frequencies, wherein the storing destination control unit receives the data, then judges a class of the received data, and attaches priority of the received data based upon the class of the data, referring to the information stored in the data priority information storage unit.

3. A stream data control server according to claim 2, further comprising:

a storing destination information storage unit which stores therein information for indicating in which of the plurality of storage units the respective data is stored.

4. A stream data control server according to claim 2, wherein:

the storing destination control unit determines one of the plurality of storage units as a storing destination for each data priority of data at a predetermined timing based upon the processable flow rate of each of the plurality of storage units and the data flow rate for each class; and the storing destination control unit judges a data priority of data for the respective data, and controls the storing destinations of the data in accordance with the storing destination for each data priority which has been determined at present.

5. A stream data control server according to claim 2, further comprising:

a storing destination determining rule storage unit which stores a storing destination determining rule corresponding to information which defines a combination of a class of data to which a data priority is attached, a condition of a system status indicated by a value of a data flow rate for at least one class and a value of a processable flow rate for at least one storage unit, and a storing destination of data belonging to the class when the class of data satisfies the condition; and a data classifying unit which classifies the data by the class, wherein:

the classified data flow rate managing unit calculates a data flow rate for each class of data which is classified by the data classifying unit; and the storing destination control unit controls the storing destination of each data by judging whether a system status at present, which is indicated by a combination of the processable flow rate of each of the plurality of storage units managed by the processable flow rate managing unit and the data flow rate for each class managed by the classified data flow rate managing unit, satisfies one of the conditions that defined by the storing destination determining rule associated with the class of the data.

6. A stream data control server according to claim 5, further comprising:

a learning model producing unit which learns a correlation between each of the plurality of storage units and the class of data stored in each of the plurality of storage units at a predetermined timing under a condition of a system status which is indicated by the processable flow rate of each of the plurality of storage units and the data flow rate for each class at present to produce a learning model, the learning model being employed to judge whether data belonging to each of the classes is to be stored in each of the plurality of storage units under the condition of the system status, wherein the storing destination control unit is provided in correspondence with each of the plurality of storage units, and is realized by a judging unit which judges whether the data is to be stored in the corresponding storage unit in accordance with the learning model produced by the learning model producing unit under the condition of the system status which is indicated by the processable flow rate of each of the plurality of storage units and the data flow rate for each class at present.

7. A stream data control server according to claim 2, wherein:

the processable flow rate managing unit calculates the processable flow rate of each of the plurality of storage units based upon process performance and an amount of processed data of each of the plurality of storage units at a predetermined timing so as to manage the processable flow rate of each of the plurality of storage units; and the classified data flow rate managing unit calculates the data flow rate for each class of data based upon the classes of data which have been so far acquired and a data acquisition time at a predetermined timing to manage the data flow rates for each class.

8. A stream data control server according to claim 2, wherein:

the processable flow rate managing unit calculates storable capacity of each of the plurality of storage units based upon storage capacity and an amount of processed data of each of the plurality of storage units at a predetermined timing to manage the storable capacity of each of the plurality of storage units; and the storing destination control unit controls the storing destinations of the respective data based upon the processable flow rate and the storable capacity of each of the plurality of storage units, and the data flow rate for each class such that data having higher data priorities are stored in order in storage units having higher priorities within a range of the processable flow rate and the storable capacity of each of the plurality of storage units.

9. A stream data control server according to claim 8, wherein:
the processable flow rate calculating unit acquires information required for calculating one of the processable flow rate and the storable capacity by employing a network management protocol.

10. A stream data control server for processing inputted received data by any one of a plurality of processing units, comprising:
a processable flow rate managing unit which manages a processable flow rate corresponding to an amount of data per unit time, which can be processed in each of the plurality of processing units;
a classified data flow rate managing unit which calculates a data flow rate of the received data corresponding to an amount of the received data per unit time for each class of data to which a predetermined data priority is attached; and
a processing destination control unit which controls processing destinations of respective data based upon the processable flow rate of each of the plurality of processing units and the data flow rate for each class such that the data having higher data priorities is processed by the processing units having higher priorities within a range of the processable flow rate of each of the plurality of processing units;
a data priority information storage unit which stores therein information used to judge a class of data to which a data priority is attached, in correspondence with a data priority which is attached to a data belonging to the class;
an access information storage unit which stores therein information for indicating when data stored in each of the plurality of storage units was accessed; and
a data priority updating unit which judges classes of the accessed data so as to calculate an access frequency for each class, and which updates the data priorities stored in the data priority information storage unit so that higher data priorities are attached in order of data having higher access frequencies,
wherein a class of the received data is judged, and priority of the received data is attached based upon the class of the data, referring to the information stored in the data priority information storage unit.

11. A stream data control method of storing inputted received data in any one of a plurality of storage units, comprising:
managing a processable flow rate corresponding to an amount of data per unit time, which can be processed in each of the plurality of storage units;
calculating a data flow rate of the received data corresponding to an amount of the received data per unit time for each class of data to which a data priority is attached; and
controlling storing destinations of respective data based upon the processable flow rate of each of the plurality of storage units and the data flow rate for each class such that the data having higher data priorities are stored in the storage units having higher priorities within a range of the processable flow rate of each of the plurality of storage units;
storing data priority information which defines information used to judge a class of data to which a data priority is attached in correspondence with a data priority which is attached to a data belonging to the class;
storing information for indicating when data stored in each of the plurality of storage units was accessed;
judging classes of the accessed received data to calculate an access frequency for each class, and updating the data priorities in the data priority information in such a manner that higher data priorities are attached in order of data having higher access frequencies; and
attaching priority of the received data based upon one of the classes of the data, referring to information in the data priority information.

12. A stream data control method according to claim 11, further comprising:
storing information for indicating in which of the plurality of storage units the respective data is stored.

13. A stream data control method according to claim 11, further comprising:
determining one of the plurality of storage units as a storing destination for each data priority of data at a timing based upon the processable flow rate of each of the plurality of storage units and the data flow rate for each class; and
judging a data priority of data for the respective data, and controlling the storing destinations of the data in accordance with the storing destination for each data priority which has been determined.

14. A stream data control method according to claim 11, further comprising:
storing a storing destination determining rule corresponding to information which defines a combination of a class of data to which a data priority is attached, a condition of a system status indicated by a value of a data flow rate for at least one class and a value of a processable flow rate for at least one storage unit, and a storing destination of data belonging to the class when the class of data satisfies the condition;
calculating a data flow rate for each class of data which is classified by the class of the data; and
judging whether a system status, which is indicated by a combination of the processable flow rate of each of the plurality of storage units and the data flow rate for each class, satisfies one of the conditions that defined by the storing destination determining rule associated with the class of the data.

15. A stream data control method according to claim 14, further comprising:
learning a correlation between each of the plurality of storage units and the class of data stored in each of the plurality of storage units at a predetermined timing under a condition of a system status which is indicated by the processable flow rate of each of the plurality of storage units and the data flow rate for each class at present to produce a learning model, the learning model being employed to judge whether data belonging to each of the classes is to be stored in each of the plurality of storage units under the condition of the system status; and
judging, by judging unit provided in correspondence with each of the plurality of storage units, whether the data is to be stored in the corresponding storage unit in accordance with the learning model under the condition of the system status which is indicated by the processable flow rate of each of the plurality of storage units and the data flow rate for each class.

16. A stream data controlling program for inputted received data in any one of a plurality of storage units, causing a computer to execute the processes of:

calculating a processable flow rate corresponding to an amount of data per unit time, which can be processed in each of the plurality of storage units;

calculating a data flow rate of the received data corresponding to an amount of the received data per unit time for each class of data to which a data priority is attached; and controlling storing destinations of respective data based upon the processable flow rate of each of the plurality of storage units and the data flow rate for each class such that the data having higher data priorities are stored in the storage units having higher priorities within a range of the processable flow rate of each of the plurality of storage units, wherein:

the computer comprises storage unit which stores therein data priority information which defines information used to judge a class of data to which a data priority is attached in correspondence with a data priority attached to data belonging to the class; and the stream data controlling program causes the computer to execute the processes of:

based upon information for indicating when data stored in each of the plurality of storage units was accessed, judging classes of the accessed data to calculate an access frequency for each class, and updating the data priorities in the data priority information such that higher data priorities are attached in order of data having higher access frequencies; and judging a class of the received data, and attaching priority of the received data based upon the class of the data, referring to the data priority information.

17. A stream data controlling program according to claim 16, wherein:

the computer comprises storage unit which stores therein a storing destination determining rule corresponding to information which defines a combination of a class of data to which a data priority is attached, a condition of a system status indicated by a value of a data flow rate for at least one class and a value of a processable flow rate for at least one storage unit, and a storing destination of data belonging to the class when the class of data satisfies the condition; and the stream data controlling program causes the computer to execute the processes of:

calculating the data flow rate for each class of data classified by the class of data; and judging whether a system status, which is indicated by a combination of the processable flow rate of each of the plurality of storage units and the flow rate for each class, satisfies one of the conditions that defined by the storing destination determining rule associated with the class of the data.

18. A stream data controlling program according to claim 16, further causing the computer to execute the processes of:

learning a correlation between each of the plurality of storage units and the class of data stored in each of the plurality of storage units at a predetermined timing under a condition of a system status which is indicated by the processable flow rate of each of the plurality of storage units and the data flow rate for each class to produce a learning model, the learning model being employed to judge whether data belonging to each of the classes is to be stored in each of the plurality of storage units under the condition of the system status; and causing a judging unit provided in correspondence with each of the plurality of storage units to judge whether the data is to be stored in the corresponding storage unit in accordance with the produced learning model under the condition of the system status which is indicated by the processable flow rate of each of the plurality of storage units and the data flow rate for each class.

* * * * *